(12) United States Patent
Tohme et al.

(10) Patent No.: US 10,089,789 B2
(45) Date of Patent: Oct. 2, 2018

(54) COORDINATE MEASURING DEVICE WITH A SIX DEGREE-OF-FREEDOM HANDHELD PROBE AND INTEGRATED CAMERA FOR AUGMENTED REALITY

(71) Applicant: FARO Technologies, Inc., Lake Mary, FL (US)

(72) Inventors: Yazid Tohme, Sanford, FL (US); Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 15/215,031

(22) Filed: Jul. 20, 2016

(65) Prior Publication Data

US 2016/0335803 A1 Nov. 17, 2016

Related U.S. Application Data

(63) Continuation of application No. 14/733,130, filed on Jun. 8, 2015, now Pat. No. 9,402,070.
(Continued)

(51) Int. Cl.
*G06T 19/00* (2011.01)
*G06F 3/01* (2006.01)
(Continued)

(52) U.S. Cl.
CPC .......... *G06T 19/006* (2013.01); *G01B 11/002* (2013.01); *G01B 11/14* (2013.01);
(Continued)

(58) Field of Classification Search
None
See application file for complete search history.

(56) References Cited

U.S. PATENT DOCUMENTS

| 5,402,582 A | 4/1995 | Raab |
| 5,611,147 A | 3/1997 | Raab |

(Continued)

FOREIGN PATENT DOCUMENTS

| EP | 0631250 A2 | 12/1994 |
| EP | 1033679 A1 | 9/2000 |

(Continued)

OTHER PUBLICATIONS

International Search Report and Written Opinion for Application No. PCT/US2015/035001 dated Dec. 14, 2015; 13 pgs.
(Continued)

*Primary Examiner* — Kate Luo
(74) *Attorney, Agent, or Firm* — Cantor Colburn LLP

(57) ABSTRACT

A method of combining 2D images into a 3D image includes providing a coordinate measurement device and a six-DOF probe having an integral camera associated therewith, the six-DOF probe being separate from the coordinate measurement device. In a first instance, the coordinate measurement device determines the position and orientation of the six-DOF probe and the integral camera captures a first 2D image. In a second instance, the six-DOF probe is moved, the coordinate measurement device determines the position and orientation of the six-DOF probe, and the integral camera captures a second 2D image. A cardinal point common to the first and second image is found and is used, together with the first and second images and the positions and orientations of the six-DOF probe in the first and second instances, to create the 3D image.

20 Claims, 18 Drawing Sheets

Related U.S. Application Data

(60) Provisional application No. 62/011,151, filed on Jun. 12, 2014.

(51) Int. Cl.

| | | |
|---|---|---|
| *G06F 3/03* | (2006.01) | |
| *G06F 3/0346* | (2013.01) | |
| *G01S 17/89* | (2006.01) | |
| *H04N 13/275* | (2018.01) | |
| *G01S 17/02* | (2006.01) | |
| *G01S 17/66* | (2006.01) | |
| *G01B 11/00* | (2006.01) | |
| *G01B 11/14* | (2006.01) | |
| *G01S 7/481* | (2006.01) | |
| *G06F 3/0354* | (2013.01) | |
| *H04N 13/02* | (2006.01) | |
| *G06T 7/60* | (2017.01) | |
| *G06T 15/20* | (2011.01) | |
| *G06T 7/30* | (2017.01) | |
| *G06T 7/70* | (2017.01) | |
| *G06T 7/50* | (2017.01) | |
| *G06T 7/55* | (2017.01) | |

(52) U.S. Cl.
CPC .......... *G01S 7/4813* (2013.01); *G01S 17/023* (2013.01); *G01S 17/66* (2013.01); *G01S 17/89* (2013.01); *G06F 3/011* (2013.01); *G06F 3/0304* (2013.01); *G06F 3/0346* (2013.01); *G06F 3/03545* (2013.01); *G06T 7/30* (2017.01); *G06T 7/50* (2017.01); *G06T 7/55* (2017.01); *G06T 7/60* (2013.01); *G06T 7/70* (2017.01); *G06T 15/20* (2013.01); *H04N 13/0275* (2013.01); *H04N 13/275* (2018.05)

(56) References Cited

U.S. PATENT DOCUMENTS

| | | | |
|---|---|---|---|
| 5,821,943 A | 10/1998 | Shashua | |
| 6,175,647 B1 | 1/2001 | Schick et al. | |
| 6,271,855 B1 | 8/2001 | Shum et al. | |
| 6,421,629 B1 | 7/2002 | Ishlyama | |
| 6,711,293 B1 | 11/2004 | Lowe | |
| 7,352,446 B2 | 4/2008 | Bridges et al. | |
| 7,800,758 B1 | 9/2010 | Bridges et al. | |
| 7,952,728 B2* | 5/2011 | Ibach | B25J 9/1692 356/614 |
| 8,081,297 B2* | 12/2011 | Bridges | G01B 11/002 356/3.01 |
| 8,237,934 B1* | 8/2012 | Cooke | G01S 17/66 356/614 |
| 8,467,072 B2* | 6/2013 | Cramer | G01B 11/03 356/614 |
| 8,525,983 B2 | 9/2013 | Bridges et al. | |
| 8,533,967 B2 | 9/2013 | Bailey et al. | |
| 9,091,536 B2 | 7/2015 | Hausler | |
| 9,158,875 B2 | 10/2015 | Morgana et al. | |
| 9,402,070 B2 | 7/2016 | Tohme et al. | |
| 2002/0094134 A1 | 7/2002 | Nafis et al. | |
| 2005/0166413 A1 | 8/2005 | Crampton | |
| 2007/0091174 A1 | 4/2007 | Kochi et al. | |
| 2008/0024484 A1 | 1/2008 | Naimark | |
| 2010/0026982 A1* | 2/2010 | Kludas | G01C 11/025 356/4.01 |
| 2011/0178764 A1 | 7/2011 | York | |
| 2012/0148100 A1 | 6/2012 | Kotake et al. | |
| 2012/0182294 A1* | 7/2012 | Cordon Garcia | G06T 17/00 345/419 |
| 2012/0206716 A1* | 8/2012 | Cramer | G01B 11/03 356/72 |
| 2012/0257017 A1 | 10/2012 | Pettersson et al. | |
| 2012/0262550 A1 | 10/2012 | Bridges | |
| 2013/0027515 A1* | 1/2013 | Vinther | A61B 1/00177 348/44 |
| 2013/0096873 A1 | 4/2013 | Rosengaus et al. | |
| 2013/0155047 A1* | 6/2013 | Williams | G06T 15/205 345/419 |
| 2013/0238124 A1 | 9/2013 | Suzuki et al. | |
| 2013/0278727 A1* | 10/2013 | Tamir | H04N 13/0048 348/47 |
| 2013/0293684 A1 | 11/2013 | Becker et al. | |
| 2013/0314689 A1 | 11/2013 | Jones et al. | |
| 2014/0028805 A1 | 1/2014 | Tohme | |
| 2014/0063489 A1 | 3/2014 | Steffey et al. | |
| 2014/0078519 A1 | 3/2014 | Steffey et al. | |
| 2014/0104387 A1 | 4/2014 | Klusza et al. | |
| 2014/0139639 A1 | 5/2014 | Wagner et al. | |
| 2014/0192187 A1 | 7/2014 | Atwell et al. | |
| 2014/0267620 A1* | 9/2014 | Bridges | G01S 17/003 348/46 |
| 2015/0002659 A1 | 1/2015 | Atwell | |
| 2015/0075018 A1 | 3/2015 | Bridges | |
| 2015/0130906 A1 | 5/2015 | Bridges | |
| 2015/0365653 A1 | 12/2015 | Tohme | |
| 2015/0373321 A1 | 12/2015 | Bridges | |
| 2016/0093099 A1 | 3/2016 | Bridges | |
| 2016/0171776 A1 | 6/2016 | Bridges | |
| 2016/0335796 A1 | 11/2016 | Roimela | |
| 2017/0067734 A1 | 3/2017 | Heidemann et al. | |

FOREIGN PATENT DOCUMENTS

| | | |
|---|---|---|
| EP | 2031558 A2 | 3/2009 |
| JP | 2009058503 A | 3/2009 |
| JP | 2011085971 A | 4/2011 |
| JP | 2014514563 A | 6/2014 |
| WO | 2011134083 A1 | 11/2011 |

OTHER PUBLICATIONS http://en.wikipedia.org/wiki/Augmented_reality; 22 pages.

Geng, J., et al., "DLP-based structured light 3D imaging technologies and applications", Emerging Digitial Micromirror Device Based Systems and Applications III, SPIE, vol. 7932, No. 1, Feb. 10, 2011 (Feb. 10, 2011).

* cited by examiner

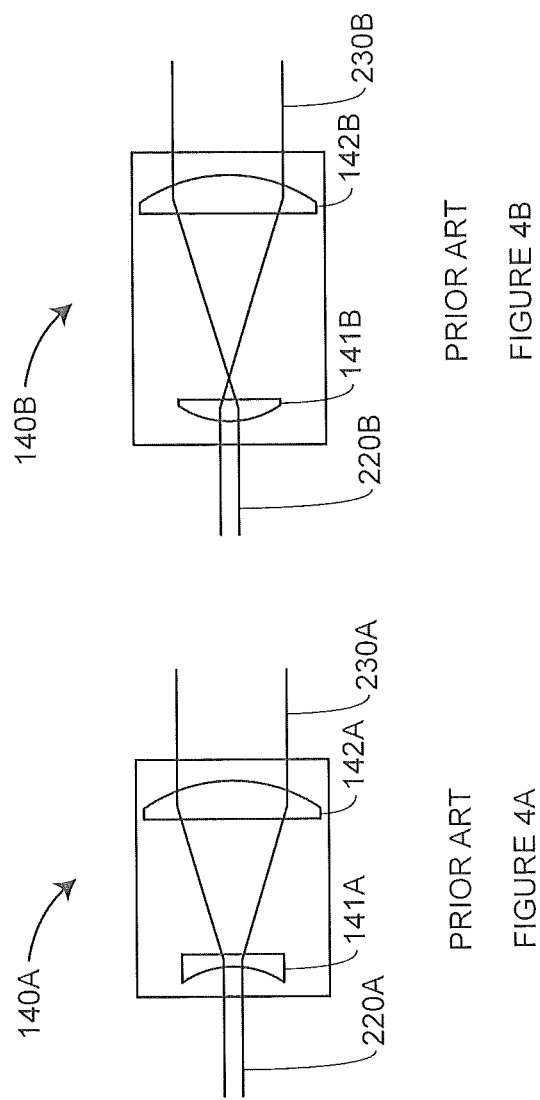

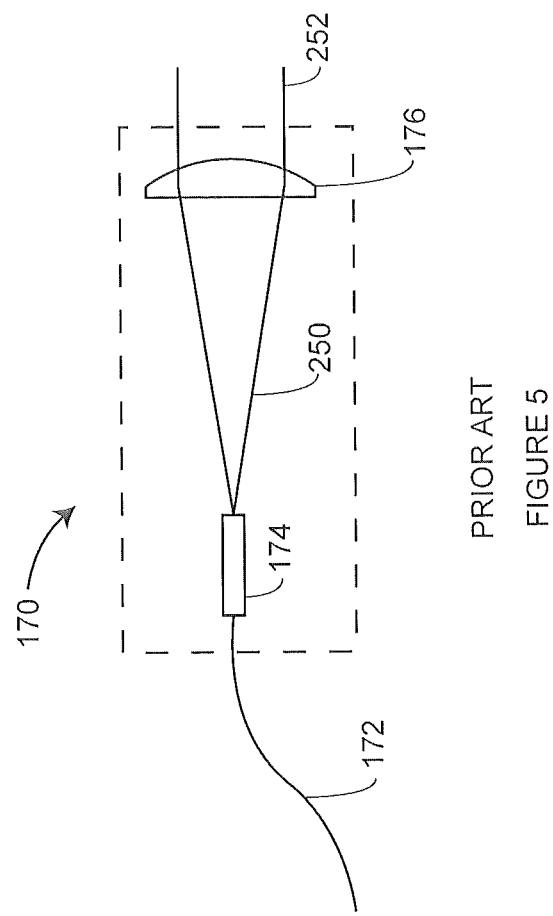

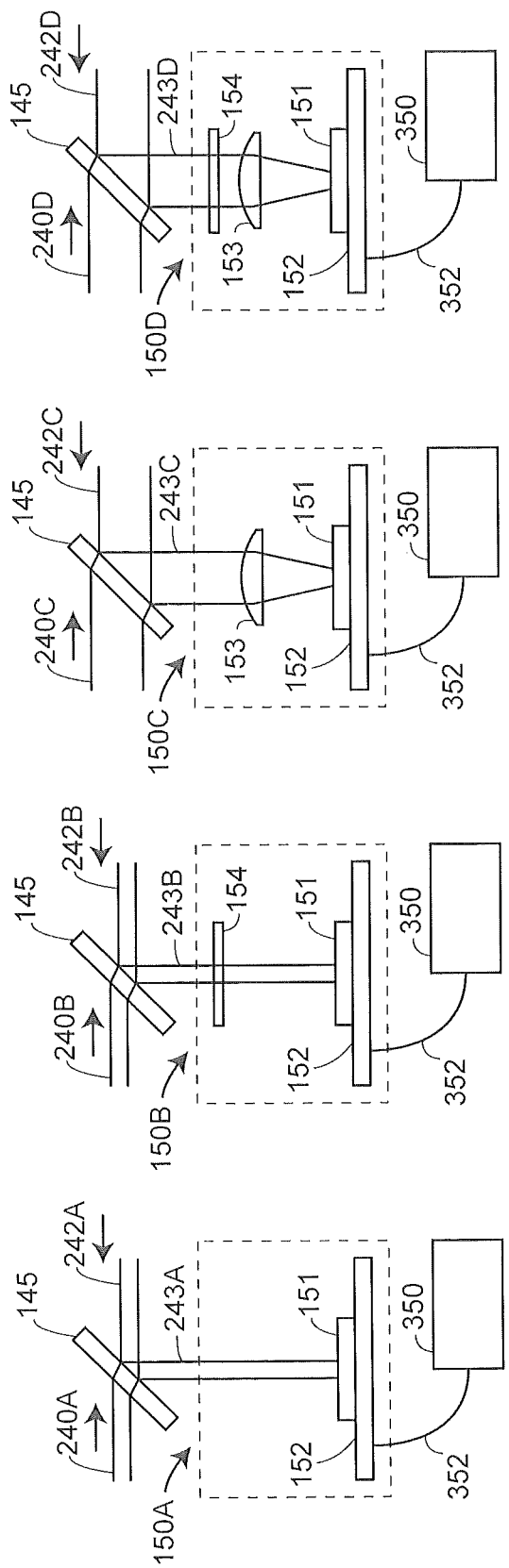

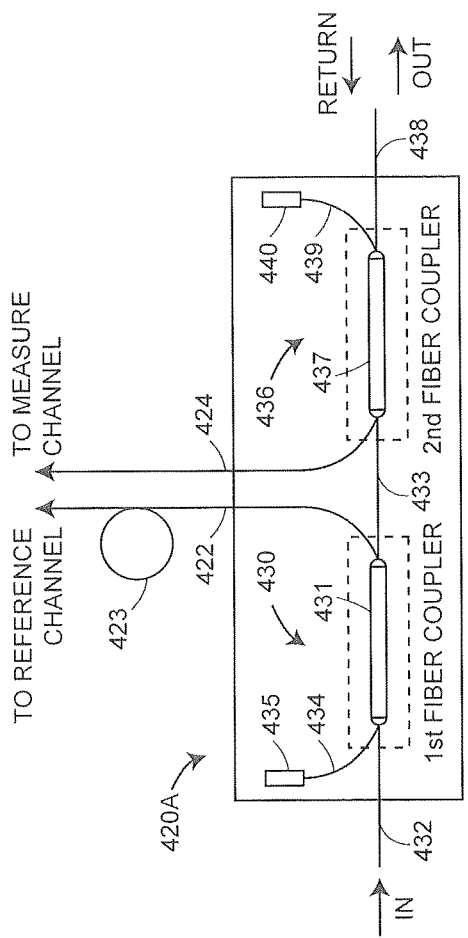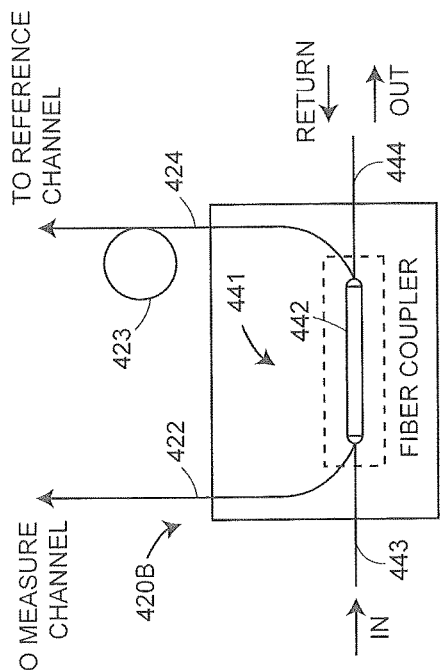
PRIOR ART
FIGURE 8A
PRIOR ART
FIGURE 8B

COORDINATE MEASURING DEVICE WITH A SIX DEGREE-OF-FREEDOM HANDHELD PROBE AND INTEGRATED CAMERA FOR AUGMENTED REALITY

CROSS REFERENCE TO RELATED APPLICATIONS

This application is a continuation application of U.S. patent application Ser. No. 14/733,130 filed on Jun. 8, 2015, U.S. application Ser. No. 14/733,130 is a nonprovisional patent application of U.S. Provisional Application Ser. No. 62/011,151 filed Jun. 12, 2014, the contents of which are incorporated herein by reference in their entirety.

BACKGROUND

The present disclosure relates to a coordinate measuring device with a handheld six degree-of-freedom (6DOF) probe having an integrated camera to achieve augmented reality (AR).

One set of coordinate measurement devices belongs to a class of instruments that measure the three-dimensional (3D) coordinates of a point by sending a laser beam to the point. The laser beam may impinge directly on the point or on a retroreflector target in contact with the point. In either case, the instrument determines the coordinates of the point by measuring the distance and the two angles to the target. The distance is measured with a distance measuring device such as an absolute distance meter or an interferometer. The angles are measured with an angle measuring device such as an angular encoder. A gimbaled beam-steering mechanism within the instrument directs the laser beam to the point of interest.

The laser tracker is a particular type of coordinate measuring device that tracks the retroreflector target with one or more laser beams it emits. Coordinate measuring devices closely related to the laser tracker are the laser scanner and the total station. The laser scanner steps one or more laser beams to points on a surface. It picks up light scattered from the surface and from this light determines the distance and two angles to each point. The total station, which is most often used in surveying applications, may be used to measure the coordinates of diffusely scattering or retroreflective targets. Hereinafter, the term laser tracker is used in a broad sense to include laser scanners and total stations.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

One type of laser tracker contains only an interferometer (IFM) without an absolute distance meter (ADM). If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. U.S. Pat. No. 7,352,446 ('446) to Bridges et al., the contents of which are incorporated herein by reference, describes a laser tracker having only an ADM (and no IFM) that is able to accurately scan a moving target. Prior to the '446 patent, absolute distance meters were too slow to accurately find the position of a moving target.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical axes of the laser tracker to keep the laser beam centered on the SMR. In this way, the tracker is able to follow (track) an SMR that is moved over the surface of an object of interest.

Angle measuring devices such as angular encoders are attached to the mechanical axes of the tracker. The one distance measurement and two angle measurements performed by the laser tracker are sufficient to completely specify the three-dimensional location of the SMR at any point on the surface of the object being measured.

Several laser trackers have been disclosed for measuring six, rather than the ordinary three, degrees of freedom. Exemplary six degree-of-freedom (six-DOF or 6DOF) laser tracker systems are described by U.S. Pat. No. 7,800,758 ('758) to Bridges et al., U.S. Pat. No. 8,525,983 ('983) to Bridges et al., and U.S. Pat. No. 8,467,072 ('072) to Cramer et al., the contents of each of which are incorporated herein by reference.

Augmented reality (AR) is a relatively new type of technology that grew out of virtual reality. Augmented reality merges, superimposes, or transprojects actual real-world information or data with, on, or onto virtual information or data. That is, the virtual information or data "augments," compliments or supplements the actual sensed, measured, captured or imaged real-world information or data related to some object or scene to give the user an enhanced view or perception of the real world object or scene. Augmented reality applications include technical or industrial areas such as part, component or device manufacturing and assembly and/or repair and maintenance, and facility, building or structure layout and construction. A number of modern-day AR applications are disclosed at http://en.wikipedia.org/wiki/Augmented_reality.

The actual information or data relating to the part, component or device or area may be obtained in various ways using various devices. One type of device includes a measuring device such as a coordinate measuring device, for example, a coordinate measuring machine (CMM), or a laser tracker. A camera may also be used to take still or video images of the actual part, component or device, and/or a desired area by itself or that surrounding or associated with the part, component or device.

The virtual information or data may be stored artificial information regarding the part, component or device. The stored virtual information or data may be related to the design of the part, component or device ranging from, for example, simple text or symbols to relatively more complex, graphic 3D CAD design data. Besides visual information, the stored virtual information or data may also comprise audible or sound information or data. The stored virtual information or data may also relate to information such as textual or part, component or device repair or maintenance instructions, or visual information depicting parts, components or devices that may be used, for example, in the design of an office or manufacturing and/or repair facility (e.g., a building or facility layout).

The combined actual and virtual information or data in an AR system is usually digital in nature and may be delivered in real-time (i.e., as the actual information is being measured or sensed) to a user on a display screen that may be in many different types or forms, such as that associated with, for example, a desktop or laptop computer monitor, tablet, smartphone or even a head-mounted display such as those associated with glasses, hats or helmets. Audio information may be delivered through a speaker.

While some innovations have already been made in the area of augmented reality for use with various types of devices, there is a need for novel applications of augmented reality together with handheld six-DOF probes used with a laser tracker.

SUMMARY

In an embodiment, a method of combining a plurality of two-dimensional (2D) images into a three-dimensional (3D) image is provided, the method including steps of providing a six-degree of freedom (six-DOF) probe assembly, the six-DOF probe assembly including a probe stylus and a probe head, the probe stylus including a probe tip, the probe tip having a spherical shape over a portion of its surface, the spherical shape having a probe center, the probe head including a retroreflector and an integral camera; providing a coordinate measurement device having a device frame of reference, the device being separate from the six-DOF probe assembly, the coordinate measurement device including an orientation sensor, a first motor, a second motor, a first angle measuring device, a second angle measuring device, a distance meter, a position detector, a control system, and a processor, the orientation sensor configured to measure three orientational degrees of freedom of the six-DOF probe assembly, the first motor and the second motor configured together to direct a first beam of light to a first direction, the first direction determined by a first angle of rotation about a first axis and a second angle of rotation about a second axis, the first angle of rotation produced by the first motor and the second angle of rotation produced by the second motor, the first angle measuring device configured to measure the first angle of rotation and the second angle measuring device configured to measure the second angle of rotation, the distance meter configured to measure a distance from the coordinate measurement device to the retroreflector based at least in part on a first part of the first beam of light reflected by the retroreflector and received by a first optical detector and on a speed of light in air, the position detector configured to receive a second part of the first beam of light reflected by the retroreflector and to produce a first signal in response, the control system configured to send a second signal to the first motor and a third signal to the second motor, the second signal and the third signal based at least in part on the first signal, the control system configured to adjust the first direction of the first beam of light to a position in space of the retroreflector, the processor configured to determine, in the device frame of reference, 3D coordinates of the probe center, 3D coordinates of the camera, and the three orientational degrees of freedom of the six-DOF probe assembly; in a first instance: with the device, measuring a third angle with the first angle measuring device, measuring a fourth angle with the second angle measuring device, measuring with the distance meter a first distance, and measuring the three orientational degrees of freedom to obtain a first set of three orientational degrees of freedom; forming a first 2D image with the camera; in a second instance: moving the six-DOF probe assembly; with the device, measuring a fifth angle with the first angle measuring device, measuring a sixth angle with the second angle measuring device, measuring with the distance meter a second distance, and measuring the three orientational degrees of freedom to obtain a second set of three orientational degrees of freedom; forming a second 2D image with the camera; determining a first cardinal point in common between the first and second 2D images, the first cardinal point having a first location on the first 2D image and a second location on the second 2D image; determining 3D coordinates of the first cardinal point in a first frame of reference based at least in part on the first angle, the second angle, the third angle, the fourth angle, the first distance, the second distance, the first set of three orientational degrees of freedom, the second set of three orientational degrees of freedom, the first location, and the second location; creating the 3D image as a first composite 3D image from the first 2D image and the second 2D image based at least in part on the first 2D image, the second 2D image, and the 3D coordinates of the first cardinal point in the first frame of reference; and storing the first composite 3D image.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 4, which includes FIGS. 4A and 4B, shows two types of prior art afocal beam expanders;

FIG. 5 shows a prior art fiber-optic beam launch;

FIGS. 6A-D are schematic figures that show four types of prior art position detector assemblies;

FIGS. 8A and 8B are schematic figures showing fiber-optic elements within a prior art fiber-optic network;

DETAILED DESCRIPTION

Figure 1:
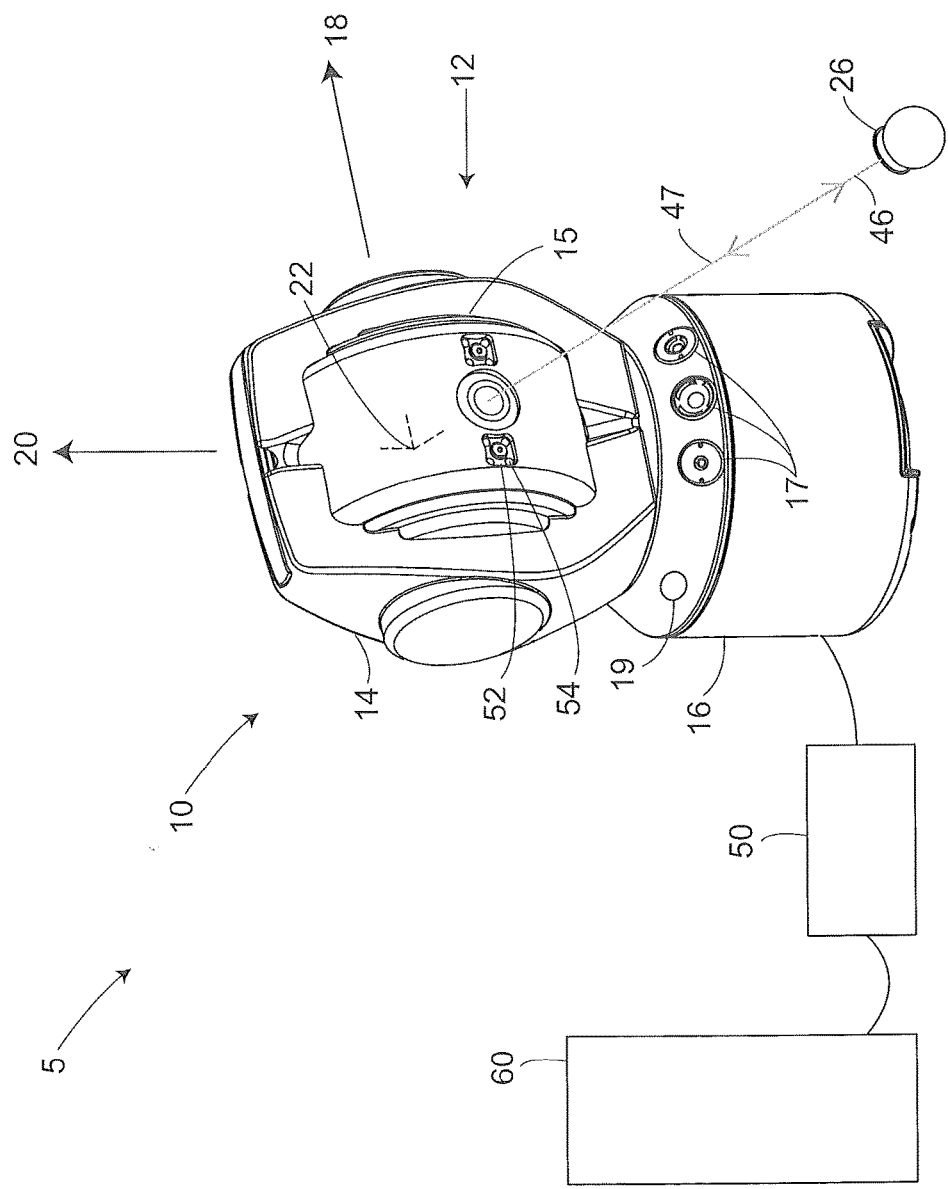
FIG. 1 is a perspective view of a laser tracker system with a retroreflector target in accordance with an embodiment of the present invention.

An exemplary laser tracker system 5 illustrated in FIG. 1 includes a laser tracker 10, a retroreflector target 26, an optional auxiliary unit processor 50, and an optional auxiliary computer 60. An exemplary gimbaled beam-steering mechanism 12 of laser tracker 10 comprises a zenith carriage 14 mounted on an azimuth base 16 and rotated about an azimuth axis 20. A payload 15 is mounted on the zenith carriage 14 and rotated about a zenith axis 18. Zenith axis 18 and azimuth axis 20 intersect orthogonally, internally to tracker 10, at gimbal point 22, which is typically the origin for distance measurements. A laser beam 46 virtually passes through the gimbal point 22 and is pointed orthogonal to zenith axis 18. In other words, laser beam 46 lies in a plane approximately perpendicular to the zenith axis 18 and that passes through the azimuth axis 20. Outgoing laser beam 46 is pointed in the desired direction by rotation of payload 15 about zenith axis 18 and by rotation of zenith carriage 14 about azimuth axis 20. A zenith angular encoder, internal to the tracker, is attached to a zenith mechanical axis aligned to the zenith axis 18. An azimuth angular encoder, internal to the tracker, is attached to an azimuth mechanical axis aligned to the azimuth axis 20. The zenith and azimuth angular encoders measure the zenith and azimuth angles of rotation to relatively high accuracy. Outgoing laser beam 46 travels to the retroreflector target 26, which might be, for example, a spherically mounted retroreflector (SMR) as described above. By measuring the radial distance between gimbal point 22 and retroreflector 26, the rotation angle about the zenith axis 18, and the rotation angle about the azimuth axis 20, the position of retroreflector 26 is found within the spherical coordinate system of the tracker.

Outgoing laser beam 46 may include one or more laser wavelengths, as described hereinafter. For the sake of clarity and simplicity, a steering mechanism of the sort shown in FIG. 1 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 17 may be included on the laser tracker for resetting the laser tracker to a "home" position for different sized SMRs—for example, 1.5, ⅞, and ½ inch SMRs. An on-tracker retroreflector 19 may be used to reset the tracker to a reference distance. In addition, an on-tracker mirror, not visible from the view of FIG. 1, may be used in combination with the on-tracker retroreflector to enable performance of a self-compensation, as described in U.S. Pat. No. 7,327,446 ('446), the contents of which are incorporated herein by reference.

Figure 2:
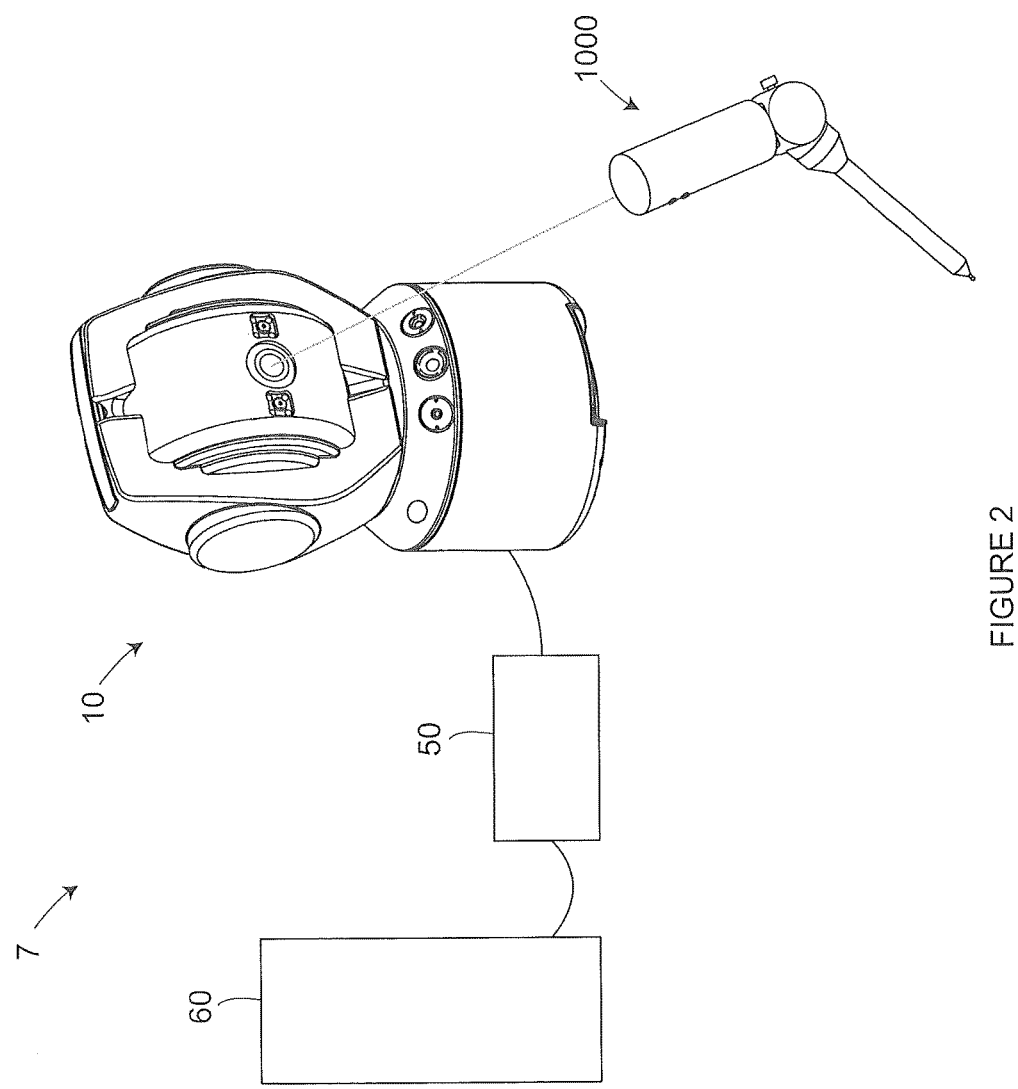
FIG. 2 is a perspective view of a laser tracker system with a six-DOF target in accordance with an embodiment of the present invention.

FIG. 2 shows an exemplary laser tracker system 7 that is like the laser tracker system 5 of FIG. 1 except that retroreflector target 26 is replaced with a six-DOF probe 1000. In FIG. 1, other types of retroreflector targets may be used. For example, a cateye retroreflector, which is a glass retroreflector in which light focuses to a small spot of light on a reflective rear surface of the glass structure, is sometimes used.

Figure 3:
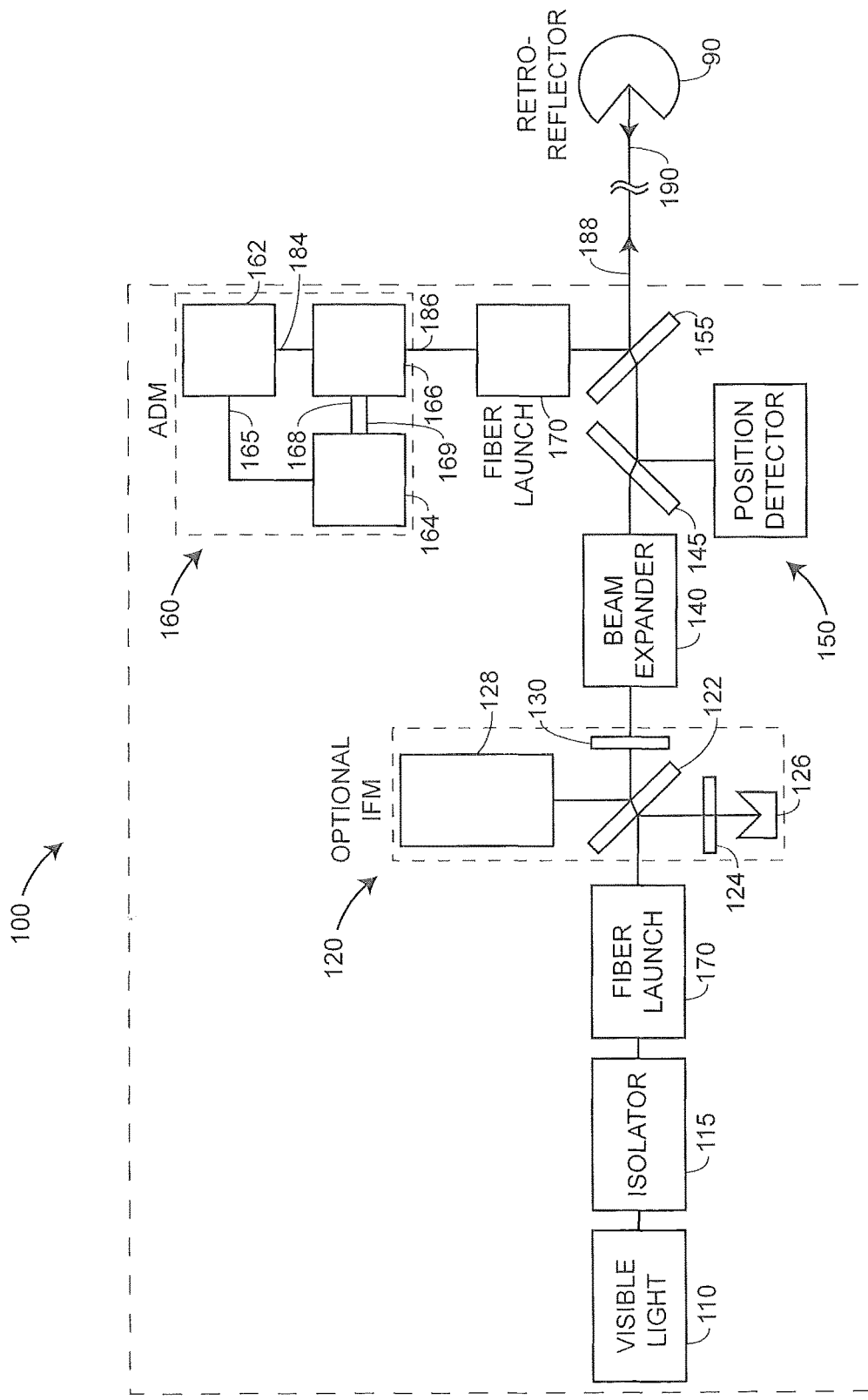
FIG. 3 is a block diagram describing elements of laser tracker optics and electronics in accordance with an embodiment of the present invention.

FIG. 3 is a block diagram showing optical and electrical elements in a laser tracker embodiment. It shows elements of a laser tracker that emit two wavelengths of light—a first wavelength for an ADM and a second wavelength for a visible pointer and for tracking. The visible pointer enables the user to see the position of the laser beam spot emitted by the tracker. The two different wavelengths are combined using a free-space beam splitter. Electrooptic (EO) system 100 includes visible light source 110, isolator 115, optional first fiber launch 170, optional interferometer (IFM) 120, beam expander 140, first beam splitter 145, position detector assembly 150, second beam splitter 155, ADM 160, and second fiber launch 170.

Visible light source 110 may be a laser, superluminescent diode, or other light emitting device. The isolator 115 may be a Faraday isolator, attenuator, or other device capable of reducing the light that reflects back into the light source. Optional IFM may be configured in a variety of ways. As a specific example of a possible implementation, the IFM may include a beam splitter 122, a retroreflector 126, quarter waveplates 124, 130, and a phase analyzer 128. The visible light source 110 may launch the light into free space, the light then traveling in free space through the isolator 115, and optional IFM 120. Alternatively, the isolator 115 may be coupled to the visible light source 110 by a fiber optic cable. In this case, the light from the isolator may be launched into free space through the first fiber-optic launch 170, as discussed hereinbelow with reference to FIG. 5.

Beam expander 140 may be set up using a variety of lens configurations, but two commonly used prior-art configurations are shown in FIGS. 4A and 4B. FIG. 4A shows a configuration 140A based on the use of a negative lens 141A and a positive lens 142A. A beam of collimated light 220A incident on the negative lens 141A emerges from the positive lens 142A as a larger beam of collimated light 230A. FIG. 4B shows a configuration 140B based on the use of two positive lenses 141B, 142B. A beam of collimated light 220B incident on a first positive lens 141B emerges from a second positive lens 142B as a larger beam of collimated light 230B. Of the light leaving the beam expander 140, a small amount reflects off the beam splitters 145, 155 on the way out of the tracker and is lost. That part of the light that passes through the beam splitter 155 is combined with light from the ADM 160 to form a composite beam of light 188 that leaves that laser tracker and travels to the retroreflector 90.

In an embodiment, the ADM 160 includes a light source 162, ADM electronics 164, a fiber network 166, an interconnecting electrical cable 165, and interconnecting optical fibers 168, 169, 184, 186. ADM electronics send electrical modulation and bias voltages to light source 162, which may, for example, be a distributed feedback laser that operates at a wavelength of approximately 1550 nm. In an embodiment, the fiber network 166 may be the prior art fiber-optic network 420A shown in FIG. 8A. In this embodiment, light from the light source 162 in FIG. 3 travels over the optical fiber 184, which is equivalent to the optical fiber 432 in FIG. 8A.

The fiber network of FIG. 8A includes a first fiber coupler 430, a second fiber coupler 436, and low-transmission reflectors 435, 440. The light travels through the first fiber coupler 430 and splits between two paths, the first path through optical fiber 433 to the second fiber coupler 436 and the second path through optical fiber 422 and fiber length equalizer 423. Fiber length equalizer 423 connects to fiber length 168 in FIG. 3, which travels to the reference channel of the ADM electronics 164. The purpose of fiber length equalizer 423 is to match the length of optical fibers traversed by light in the reference channel to the length of optical fibers traversed by light in the measure channel. Matching the fiber lengths in this way reduces ADM errors caused by changes in the ambient temperature. Such errors may arise because the effective optical path length of an optical fiber is equal to the average index of refraction of the optical fiber times the length of the fiber. Since the index of refraction of the optical fibers depends on the temperature of the fiber, a change in the temperature of the optical fibers causes changes in the effective optical path lengths of the measure and reference channels. If the effective optical path length of the optical fiber in the measure channel changes relative to the effective optical path length of the optical fiber in the reference channel, the result will be an apparent shift in the position of the retroreflector target 90, even if the retroreflector target 90 is kept stationary. To get around this problem, two steps are taken. First, the length of the fiber in the reference channel is matched, as nearly as possible, to the length of the fiber in the measure channel. Second, the measure and reference fibers are routed side by side to the extent possible to ensure that the optical fibers in the two channels see nearly the same changes in temperature.

The light travels through the second fiber optic coupler 436 and splits into two paths, the first path to the low-reflection fiber terminator 440 and the second path to optical fiber 438, from which it travels to optical fiber 186 in FIG. 3. The light on optical fiber 186 travels through to the second fiber launch 170.

In an embodiment, fiber launch 170 is shown in prior art FIG. 5. The light from optical fiber 186 of FIG. 3 goes to fiber 172 in FIG. 5. The fiber launch 170 includes optical fiber 172, ferrule 174, and lens 176. The optical fiber 172 is attached to ferrule 174, which is stably attached to a structure within the laser tracker 10. If desired, the end of the optical fiber may be polished at an angle to reduce back reflections. The light 250 emerges from the core of the fiber, which may be a single mode optical fiber with a diameter of between 4 and 12 micrometers, depending on the wavelength of the light being used and the particular type of optical fiber. The light 250 diverges at an angle and intercepts lens 176, which collimates it. The method of launching and receiving an optical signal through a single optical fiber in an ADM system was described in reference to FIG. 3 in patent '758.

Referring to FIG. 3, the beam splitter 155 may be a dichroic beam splitter, which transmits different wavelengths than it reflects. In an embodiment, the light from the ADM 160 reflects off dichroic beam splitter 155 and combines with the light from the visible laser 110, which is transmitted through the dichroic beam splitter 155. The composite beam of light 188 travels out of the laser tracker to retroreflector 90 as a first beam, which returns a portion of the light as a second beam. That portion of the second beam that is at the ADM wavelength reflects off the dichroic beam splitter 155 and returns to the second fiber launch 170, which couples the light back into the optical fiber 186.

In an embodiment, the optical fiber 186 corresponds to the optical fiber 438 in FIG. 8A. The returning light travels from optical fiber 438 through the second fiber coupler 436 and splits between two paths. A first path leads to optical fiber 424 that, in an embodiment, corresponds to optical fiber 169 that leads to the measure channel of the ADM electronics 164 in FIG. 3. A second path leads to optical fiber 433 and then to the first fiber coupler 430. The light leaving the first fiber coupler 430 splits between two paths, a first path to the optical fiber 432 and a second path to the low reflectance termination 435. In an embodiment, optical fiber 432 corresponds to the optical fiber 184, which leads to the light source 162 in FIG. 3. In most cases, the light source 162 contains a built-in Faraday isolator that minimizes the amount of light that enters the light source from optical fiber 432. Excessive light fed into a laser in the reverse direction can destabilize the laser.

Figure 7:
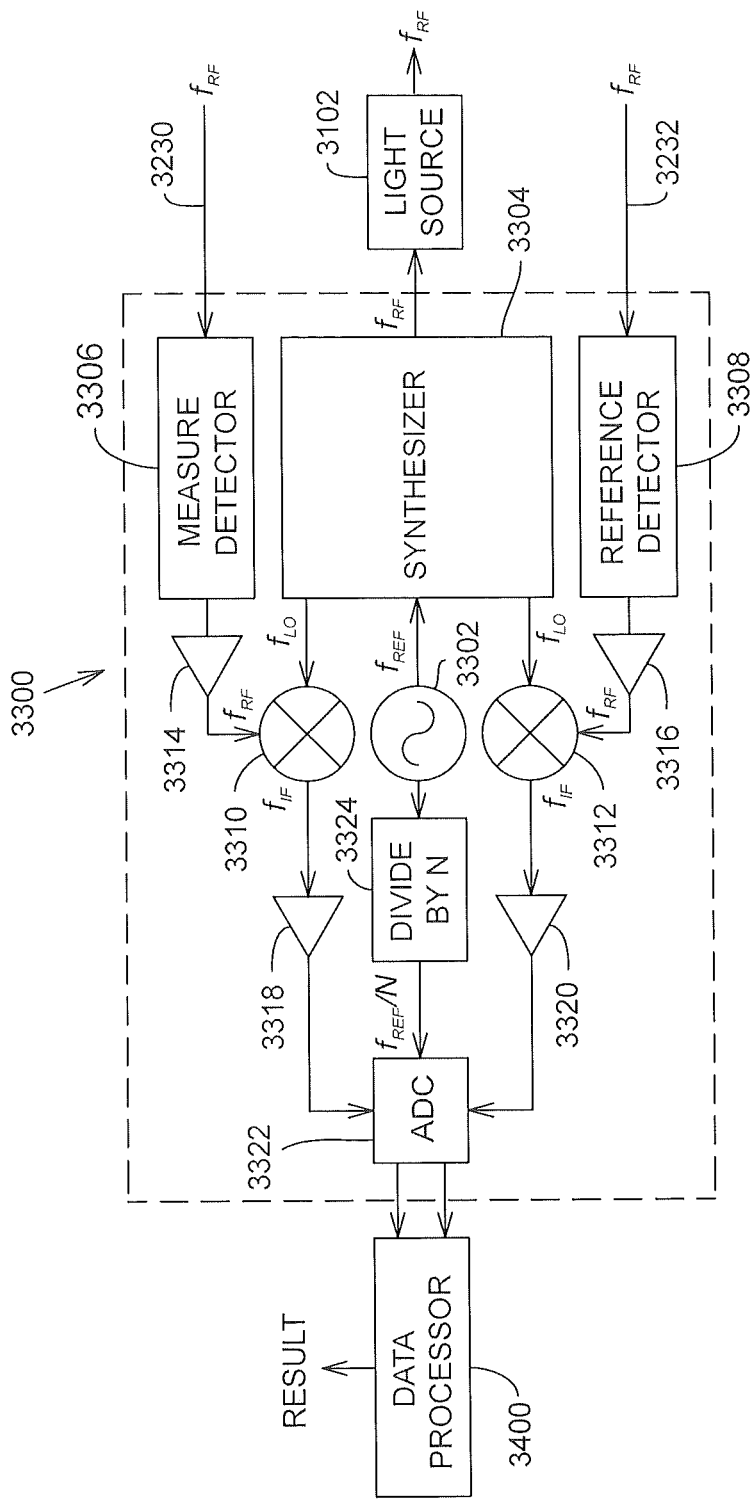
FIG. 7 is a block diagram of electrical and electro-optical elements within a prior art ADM.

The light from the fiber network 166 enters ADM electronics 164 through optical fibers 168, 169. An embodiment of prior art ADM electronics is shown in FIG. 7. Optical fiber 168 in FIG. 3 corresponds to optical fiber 3232 in FIG. 7, and optical fiber 169 in FIG. 3 corresponds to optical fiber 3230 in FIG. 7. Referring now to FIG. 7, ADM electronics 3300 includes a frequency reference 3302, a synthesizer 3304, a measure detector 3306, a reference detector 3308, a measure mixer 3310, a reference mixer 3312, conditioning electronics 3314, 3316, 3318, 3320, a divide-by-N prescaler 3324, and an analog-to-digital converter (ADC) 3322. The frequency reference, which might be an oven-controlled crystal oscillator (OCXO), for example, sends a reference frequency $f_{REF}$, which might be 10 MHz, for example, to the synthesizer, which generates two electrical signals—one signal at a frequency $f_{RF}$ and two signals at frequency $f_{LO}$. The signal $f_{RF}$ goes to the light source 3102, which corresponds to the light source 162 in FIG. 3. The two signals at frequency $f_{LO}$ go to the measure mixer 3310 and the reference mixer 3312. The light from optical fibers 168, 169 in FIG. 3 appear on fibers 3232, 3230 in FIG. 7, respectively, and enter the reference and measure channels, respectively. Reference detector 3308 and measure detector 3306 convert the optical signals into electrical signals. These signals are conditioned by electrical components 3316, 3314, respectively, and are sent to mixers 3312, 3310, respectively. The mixers produce a frequency $f_{IF}$ equal to the absolute value of $f_{LO}-f_{RF}$. The signal $f_{RF}$ may be a relatively high frequency, for example, 2 GHz, while the signal $f_{IF}$ may have a relatively low frequency, for example, 10 kHz.

The reference frequency $f_{REF}$ is sent to the prescaler 3324, which divides the frequency by an integer value. For example, a frequency of 10 MHz might be divided by 40 to obtain an output frequency of 250 kHz. In this example, the 10 kHz signals entering the ADC 3322 would be sampled at a rate of 250 kHz, thereby producing 25 samples per cycle. The signals from the ADC 3322 are sent to a data processor 3400, which might, for example, be one or more digital signal processor (DSP) units located in ADM electronics 164 of FIG. 3.

The method for extracting a distance is based on the calculation of phase of the ADC signals for the reference and measure channels. This method is described in detail in U.S. Pat. No. 7,701,559 ('559) to Bridges et al., the contents of which are incorporated herein by reference. Calculation includes use of equations (1)-(8) of patent '559. In addition, when the ADM first begins to measure a retroreflector, the frequencies generated by the synthesizer are changed some number of times (for example, three times), and the possible ADM distances calculated in each case. By comparing the possible ADM distances for each of the selected frequencies, an ambiguity in the ADM measurement is removed. The equations (1)-(8) of patent '559 combined with synchronization methods described with respect to FIG. 5 of patent '559 and the Kalman filter methods described in patent '559 enable the ADM to measure a moving target. In other embodiments, other methods of obtaining absolute distance measurements, for example, by using pulsed time-of-flight rather than phase differences, may be used.

The part of the return light beam 190 that passes through the beam splitter 155 arrives at the beam splitter 145, which sends part of the light to the beam expander 140 and another part of the light to the position detector assembly 150. The light emerging from the laser tracker 10 or EO system 100 may be thought of as a first beam and the portion of that light reflecting off the retroreflector 90 or 26 as a second beam. Portions of the reflected beam are sent to different functional elements of the EO system 100. For example, a first portion may be sent to a distance meter such as an ADM 160 in FIG. 3. A second portion may be sent to a position detector assembly 150. In some cases, a third portion may be sent to other functional units such as an optional interferometer 120. It is important to understand that, although, in the example of FIG. 3, the first portion and the second portion of the second beam are sent to the distance meter and the position detector after reflecting off beam splitters 155 and 145, respectively, it would have been possible to transmit, rather than reflect, the light onto a distance meter or position detector.

Figure 6F:
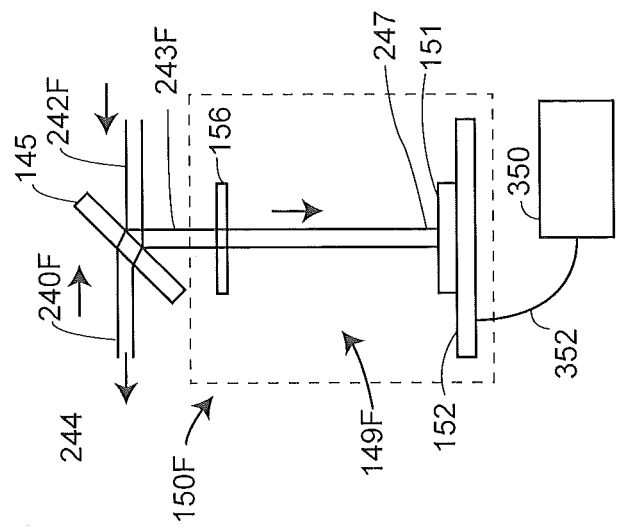
FIGS. 6E and 6F are schematic figures showing position detector assemblies according to embodiments of the present invention.

Four examples of prior art position detector assemblies 150A-150D are shown in FIGS. 6A-D. FIG. 6A depicts the simplest implementation, with the position detector assembly including a position sensor 151 mounted on a circuit board 152 that obtains power from and returns signals to electronics box 350, which may represent electronic processing capability at any location within the laser tracker 10, auxiliary unit 50, or external computer 60. FIG. 6B includes an optical filter 154 that blocks unwanted optical wavelengths from reaching the position sensor 151. The unwanted optical wavelengths may also be blocked, for example, by coating the beam splitter 145 or the surface of the position sensor 151 with an appropriate film. FIG. 6C includes a lens 153 that reduces the size of the beam of light. FIG. 6D includes both an optical filter 154 and a lens 153.

Figure 6E:
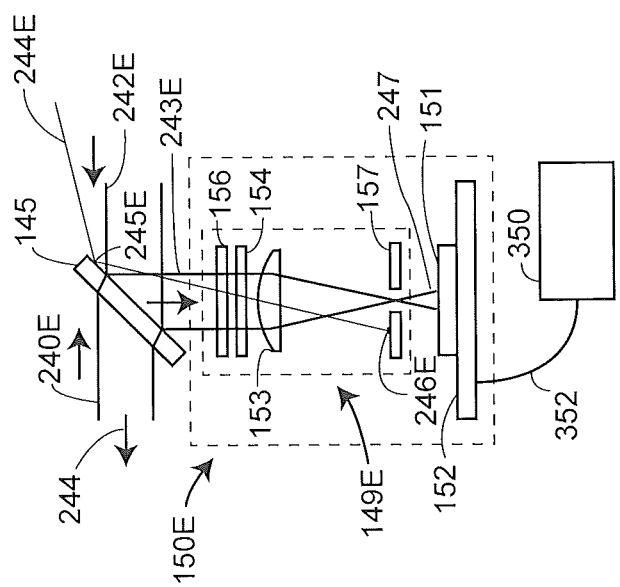

FIG. 6E shows a novel position detector assembly that includes an optical conditioner 149E. Optical conditioner contains a lens 153 and may also contain optional wavelength filter 154. In addition, it includes at least one of a diffuser 156 and a spatial filter 157. As explained hereinabove, a popular type of retroreflector is the cube-corner retroreflector. One type of cube corner retroreflector is made of three mirrors, each joined at right angles to the other two mirrors. Lines of intersection at which these three mirrors are joined may have a finite thickness in which light is not perfectly reflected back to the tracker. The lines of finite thickness are diffracted as they propagate so that upon reaching the position detector they may not appear exactly the same as at the position detector. However, the diffracted light pattern will generally depart from perfect symmetry. As a result, the light that strikes the position detector 151 may have, for example, dips or rises in optical power (hot spots) in the vicinity of the diffracted lines. Because the uniformity of the light from the retroreflector may vary from retroreflector to retroreflector and also because the distribution of light on the position detector may vary as the retroreflector is rotated or tilted, it may be advantageous to include a diffuser 156 to improve the smoothness of the light that strikes the position detector 151. It might be argued that, because an ideal position detector should respond to a centroid and an ideal diffuser should spread a spot symmetrically, there should be no effect on the resulting position given by the position detector. However, in practice the diffuser is observed to improve performance of the position detector assembly, probably because the effects of nonlinearities (imperfections) in the position detector 151 and the lens 153. Cube corner retroreflectors made of glass may also produce non-uniform spots of light at the position detector 151. Variations in a spot of light at a position detector may be particularly prominent from light reflected from cube corners in six-DOF targets, as may be understood more clearly from commonly assigned U.S. Published Patent Application No. 2012/0206808 to Brown et al., and the aforementioned commonly assigned U.S. Pat. No. 4,467,072 ('072) to Cramer et al., the contents of each of which are incorporated herein by reference. In an embodiment, the diffuser 156 is a holographic diffuser. A holographic diffuser provides controlled, homogeneous light over a specified diffusing angle. In other embodiments, other types of diffusers such as ground glass or "opal" diffusers are used.

The purpose of the spatial filter 157 of the position detector assembly 150E is to block ghost beams that may be the result, for example, of unwanted reflections off optical surfaces, from striking the position detector 151. A spatial filter includes a plate 157 that has an aperture. By placing the spatial filter 157 a distance away from the lens equal approximately to the focal length of the lens, the returning light 243E passes through the spatial filter when it is near its narrowest—at the waist of the beam. Beams that are traveling at a different angle, for example, as a result of reflection of an optical element strike the spatial filter away from the aperture and are blocked from reaching the position detector 151. An example is shown in FIG. 6E, where an unwanted ghost beam 244E reflects off a surface of the beam splitter 145 and travels to spatial filter 157, where it is blocked. Without the spatial filter, the ghost beam 244E would have intercepted the position detector 151, thereby causing the position of the beam 243E on the position detector 151 to be incorrectly determined. Even a weak ghost beam may significantly change the position of the centroid on the position detector 151 if the ghost beam is located a relatively large distance from the main spot of light.

A retroreflector of the sort discussed here, a cube corner or a cateye retroreflector, for example, has the property of reflecting a ray of light that enters the retroreflector in a direction parallel to the incident ray. In addition, the incident and reflected rays are symmetrically placed about the point of symmetry of the retroreflector. For example, in an open-air cube corner retroreflector, the point of symmetry of the retroreflector is the vertex of the cube corner. In a glass cube corner retroreflector, the point of symmetry is also the vertex, but one must consider the bending of the light at the glass-air interface in this case. In a cateye retroreflector having an index of refraction of 2.0, the point of symmetry is the center of the sphere. In a cateye retroreflector made of two glass hemispheres symmetrically seated on a common plane, the point of symmetry is a point lying on the plane and at the spherical center of each hemisphere. The main point is that, for the type of retroreflectors ordinarily used with laser trackers, the light returned by a retroreflector to the tracker is shifted to the other side of the vertex relative to the incident laser beam.

This behavior of a retroreflector 90 in FIG. 3 is the basis for the tracking of the retroreflector by the laser tracker. The position sensor has on its surface an ideal retrace point. The ideal retrace point is the point at which a laser beam sent to the point of symmetry of a retroreflector (e.g., the vertex of the cube corner retroreflector in an SMR) will return. Usually the retrace point is near the center of the position sensor. If the laser beam is sent to one side of the retroreflector, it reflects back on the other side and appears off the retrace point on the position sensor. By noting the position of the returning beam of light on the position sensor, the control system of the laser tracker 10 can cause the motors to move the light beam toward the point of symmetry of the retroreflector.

If the retroreflector is moved transverse to the tracker at a constant velocity, the light beam at the retroreflector will strike the retroreflector (after transients have settled) a fixed offset distance from the point of symmetry of the retroreflector. The laser tracker makes a correction to account for this offset distance at the retroreflector based on scale factor obtained from controlled measurements and based on the distance from the light beam on the position sensor to the ideal retrace point.

As explained hereinabove, the position detector performs two important functions—enabling tracking and correcting measurements to account for the movement of the retroreflector. The position sensor within the position detector may be any type of device capable of measuring a position. For example, the position sensor might be a position sensitive detector or a photosensitive array. The position sensitive detector might be lateral effect detector or a quadrant detector, for example. The photosensitive array might be a CMOS or CCD array, for example.

In an embodiment, the return light that does not reflect off beam splitter 145 passes through beam expander 140, thereby becoming smaller. In another embodiment, the positions of the position detector and the distance meter are reversed so that the light reflected by the beam splitter 145 travels to the distance meter and the light transmitted by the beam splitter travels to the position detector.

The light continues through optional IFM, through the isolator and into the visible light source 110. At this stage, the optical power should be small enough so that it does not destabilize the visible light source 110.

In an embodiment, the light from visible light source 110 is launched through a beam launch 170 of FIG. 5. The fiber launch may be attached to the output of light source 110 or a fiber optic output of the isolator 115.

In an embodiment, the fiber network 166 of FIG. 3 is prior art fiber network 420B of FIG. 8B. Here the optical fibers 184, 186, 168, 169 of FIG. 3 correspond to optical fibers 443, 444, 424, 422 of FIG. 8B. The fiber network of FIG. 8B is like the fiber network of FIG. 8A except that the fiber network of FIG. 8B has a single fiber coupler instead of two fiber couplers. The advantage of FIG. 8B over FIG. 8A is simplicity; however, FIG. 8B is more likely to have unwanted optical back reflections entering the optical fibers 422 and 424.

Figure 8C:
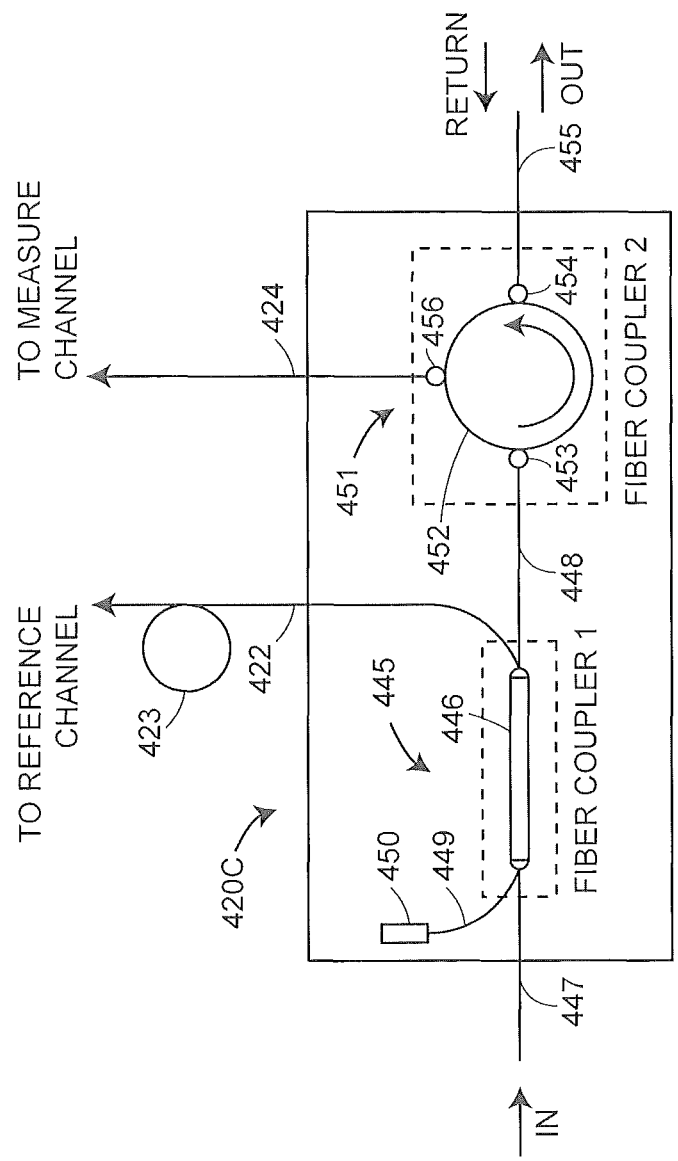
FIG. 8C is a schematic figure showing fiber-optic elements within a fiber-optic network in accordance with an embodiment of the present invention.

In an embodiment, the fiber network 166 of FIG. 3 is fiber network 420C of FIG. 8C. Here the optical fibers 184, 186, 168, 169 of FIG. 3 correspond to optical fibers 447, 455, 423, 424 of FIG. 8C. The fiber network 420C includes a first fiber coupler 445 and a second fiber coupler 451. The first fiber coupler 445 is a 2×2 coupler having two input ports and two output ports. Couplers of this type are usually made by placing two fiber cores in close proximity and then drawing the fibers while heated. In this way, evanescent coupling between the fibers can split off a desired fraction of the light to the adjacent fiber. The second fiber coupler 451 is of the type called a circulator. It has three ports, each having the capability of transmitting or receiving light, but only in the designated direction. For example, the light on optical fiber 448 enters port 453 and is transported toward port 454 as indicated by the arrow. At port 454, light may be transmitted to optical fiber 455. Similarly, light traveling on port 455 may enter port 454 and travel in the direction of the arrow to port 456, where some light may be transmitted to the optical fiber 424. If only three ports are needed, then the circulator 451 may suffer less losses of optical power than the 2×2 coupler. On the other hand, a circulator 451 may be more expensive than a 2×2 coupler, and it may experience polarization mode dispersion, which can be problematic in some situations.

Figure 9:
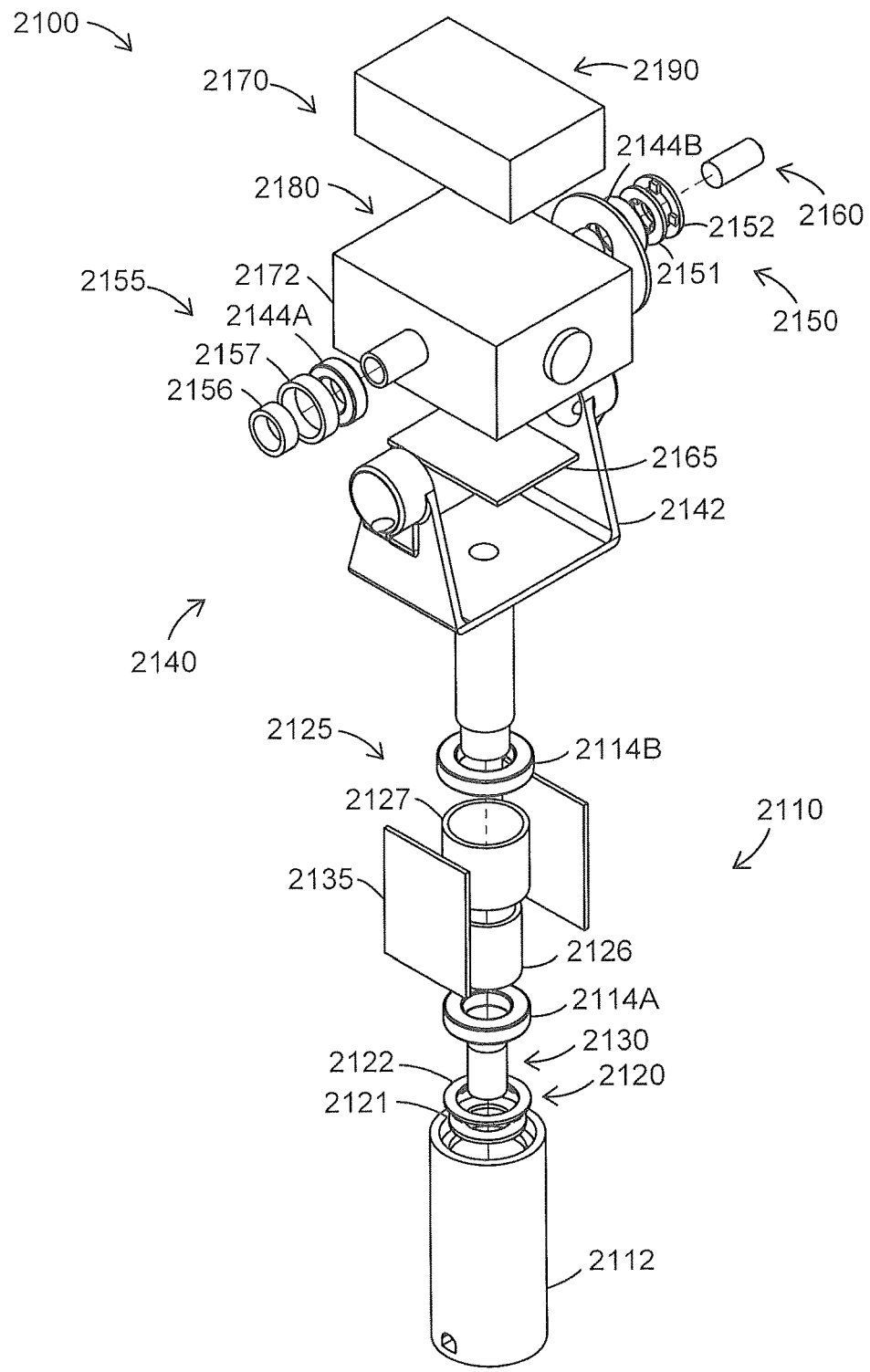
FIG. 9 is an exploded view of a prior art laser tracker.
Figure 10:
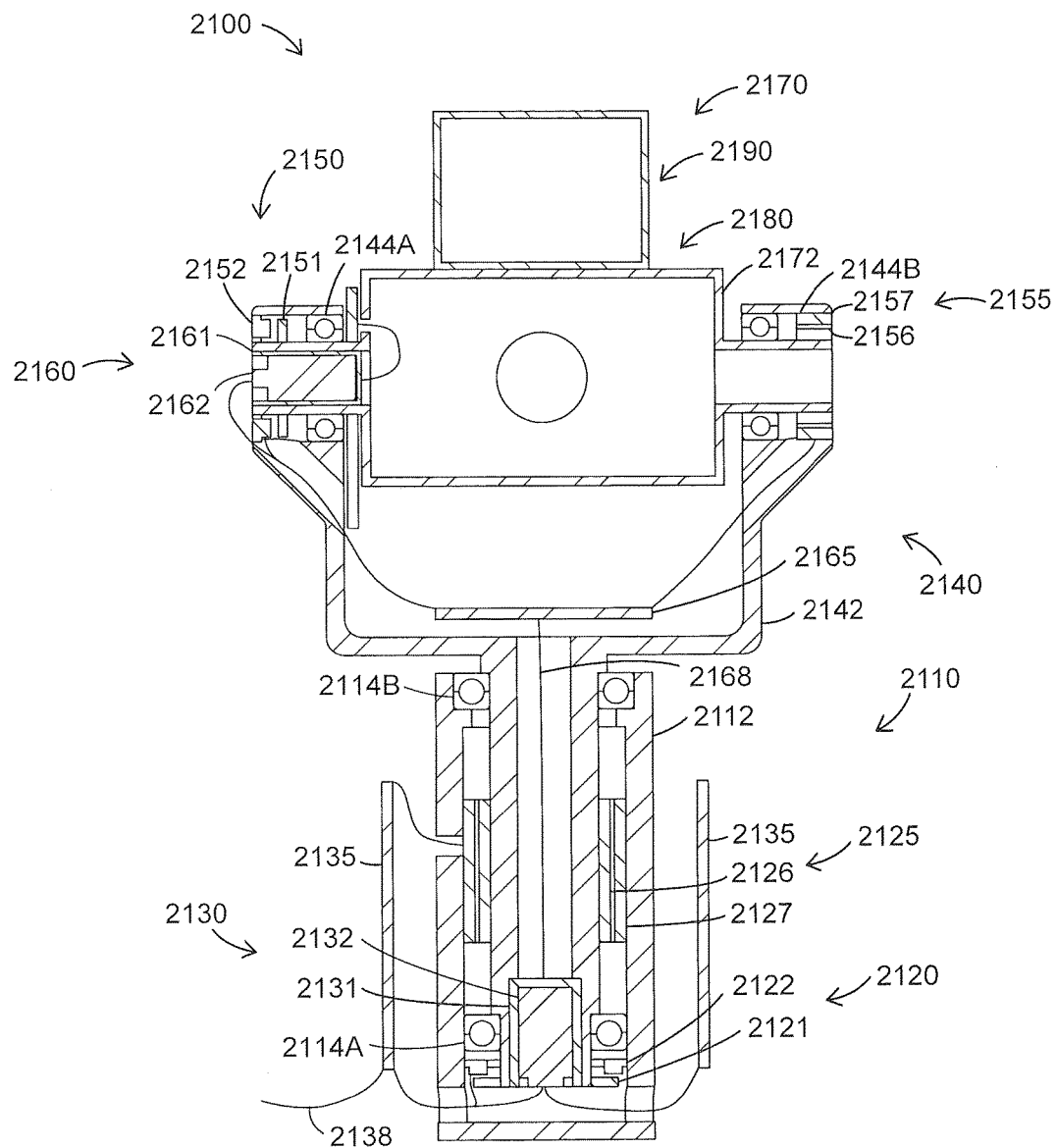
FIG. 10 is a cross-sectional view of a prior art laser tracker.

FIGS. 9 and 10 show exploded and cross sectional views, respectively, of a prior art laser tracker 2100, which is depicted in FIGS. 2 and 3 of the aforementioned patent '983. Azimuth assembly 2110 includes post housing 2112, azimuth encoder assembly 2120, lower and upper azimuth bearings 2114A, 2114B, azimuth motor assembly 2125, azimuth slip ring assembly 2130, and azimuth circuit boards 2135.

The purpose of azimuth encoder assembly 2120 is to accurately measure the angle of rotation of yoke 2142 with respect to the post housing 2112. Azimuth encoder assembly 2120 includes encoder disk 2121 and read-head assembly 2122. Encoder disk 2121 is attached to the shaft of yoke housing 2142, and read head assembly 2122 is attached to post assembly 2110. Read head assembly 2122 comprises a circuit board onto which one or more read heads are fastened. Laser light sent from read heads reflect off fine grating lines on encoder disk 2121. Reflected light picked up by detectors on encoder read head(s) is processed to find the angle of the rotating encoder disk in relation to the fixed read heads.

Azimuth motor assembly 2125 includes azimuth motor rotor 2126 and azimuth motor stator 2127. Azimuth motor rotor comprises permanent magnets attached directly to the shaft of yoke housing 2142. Azimuth motor stator 2127 comprises field windings that generate a prescribed magnetic field. This magnetic field interacts with the magnets of azimuth motor rotor 2126 to produce the desired rotary motion. Azimuth motor stator 2127 is attached to post frame 2112.

Azimuth circuit boards 2135 represent one or more circuit boards that provide electrical functions required by azimuth components such as the encoder and motor. Azimuth slip ring assembly 2130 includes outer part 2131 and inner part 2132. In an embodiment, wire bundle 2138 emerges from auxiliary unit processor 50. Wire bundle 2138 may carry power to the tracker or signals to and from the tracker. Some of the wires of wire bundle 2138 may be directed to connectors on circuit boards. In the example shown in FIG. 10, wires are routed to azimuth circuit board 2135, encoder read head assembly 2122, and azimuth motor assembly 2125. Other wires are routed to inner part 2132 of slip ring assembly 2130. Inner part 2132 is attached to post assembly 2110 and consequently remains stationary. Outer part 2131 is attached to yoke assembly 2140 and consequently rotates with respect to inner part 2132. Slip ring assembly 2130 is designed to permit low impedance electrical contact as outer part 2131 rotates with respect to the inner part 2132.

Zenith assembly 2140 comprises yoke housing 2142, zenith encoder assembly 2150, left and right zenith bearings 2144A, 2144B, zenith motor assembly 2155, zenith slip ring assembly 2160, and zenith circuit board 2165.

The purpose of zenith encoder assembly 2150 is to accurately measure the angle of rotation of payload frame 2172 with respect to yoke housing 2142. Zenith encoder assembly 2150 comprises zenith encoder disk 2151 and zenith read-head assembly 2152. Encoder disk 2151 is attached to payload housing 2142, and read head assembly 2152 is attached to yoke housing 2142. Zenith read head assembly 2152 comprises a circuit board onto which one or more read heads are fastened. Laser light sent from read heads reflect off fine grating lines on encoder disk 2151. Reflected light picked up by detectors on encoder read head(s) is processed to find the angle of the rotating encoder disk in relation to the fixed read heads.

Zenith motor assembly 2155 comprises azimuth motor rotor 2156 and azimuth motor stator 2157. Zenith motor rotor 2156 comprises permanent magnets attached directly to the shaft of payload frame 2172. Zenith motor stator 2157 comprises field windings that generate a prescribed magnetic field. This magnetic field interacts with the rotor magnets to produce the desired rotary motion. Zenith motor stator 2157 is attached to yoke frame 2142.

Zenith circuit board 2165 represents one or more circuit boards that provide electrical functions required by zenith components such as the encoder and motor. Zenith slip ring assembly 2160 comprises outer part 2161 and inner part 2162. Wire bundle 2168 emerges from azimuth outer slip ring 2131 and may carry power or signals. Some of the wires of wire bundle 2168 may be directed to connectors on circuit board. In the example shown in FIG. 10, wires are routed to zenith circuit board 2165, zenith motor assembly 2150, and encoder read head assembly 2152. Other wires are routed to inner part 2162 of slip ring assembly 2160. Inner part 2162 is attached to yoke frame 2142 and consequently rotates in azimuth angle only, but not in zenith angle. Outer part 2161 is attached to payload frame 2172 and consequently rotates in both zenith and azimuth angles. Slip ring assembly 2160 is designed to permit low impedance electrical contact as outer part 2161 rotates with respect to the inner part 2162. Payload assembly 2170 includes a main optics assembly 2180 and a secondary optics assembly 2190.

Figure 11:
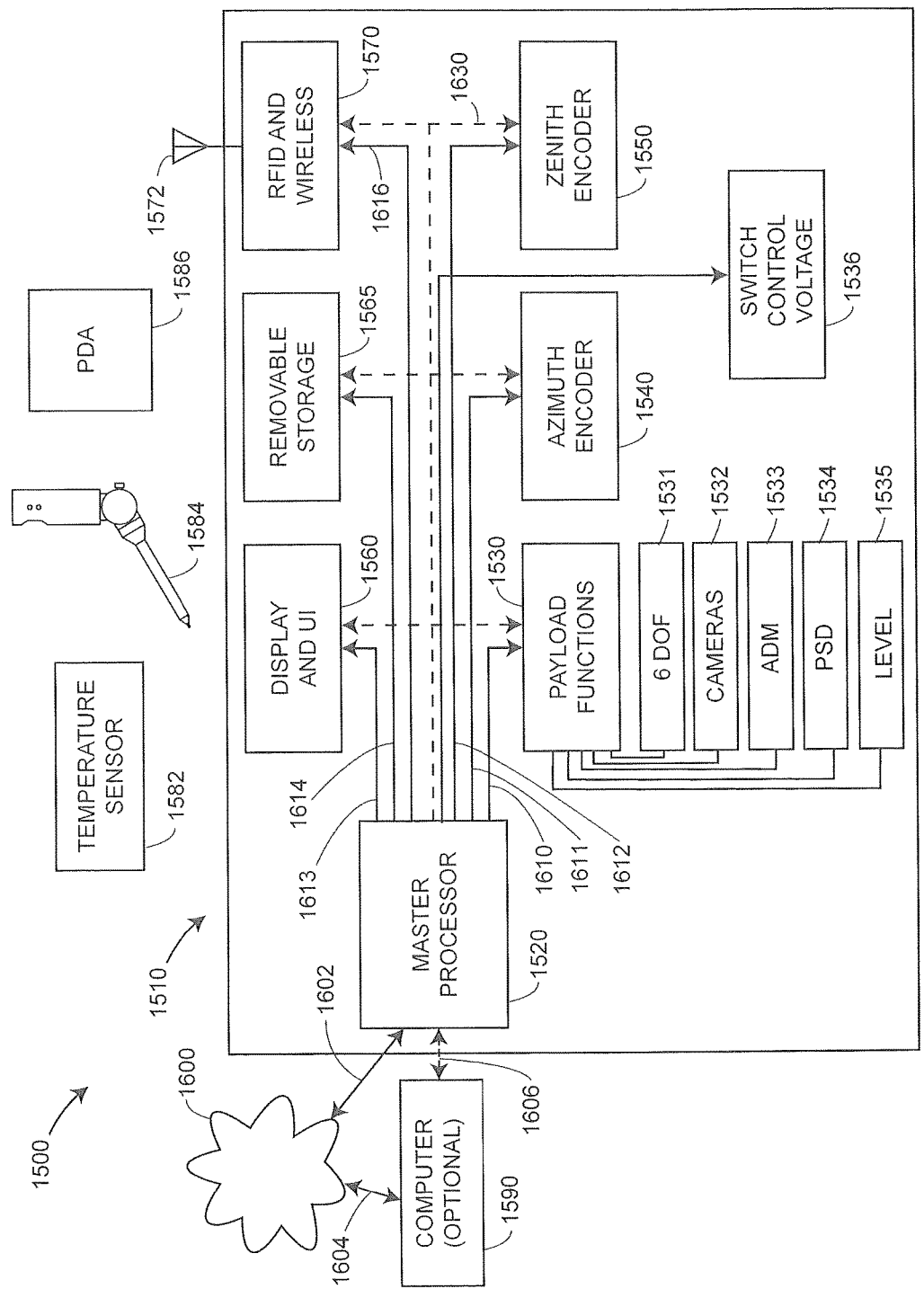
FIG. 11 is a block diagram of the computing and communication elements of a laser tracker in accordance with an embodiment of the present invention.

FIG. 11 is a block diagram depicting a dimensional measurement electronics processing system 1500 that includes a laser tracker electronics processing system 1510, processing systems of peripheral elements 1582, 1584, 1586, computer 1590, and other networked components 1600, represented here as a cloud. Exemplary laser tracker electronics processing system 1510 includes a master processor 1520, payload functions electronics 1530, azimuth encoder electronics 1540, zenith encoder electronics 1550, display and user interface (UI) electronics 1560, removable storage hardware 1565, radio frequency identification (RFID) electronics, and an antenna 1572. The payload functions electronics 1530 includes a number of subfunctions including the six-DOF electronics 1531, the camera electronics 1532, the ADM electronics 1533, the position detector (PSD) electronics 1534, and the level electronics 1535. Most of the subfunctions have at least one processor unit, which might be a digital signal processor (DSP) or field programmable gate array (FPGA), for example. The electronics units 1530, 1540, and 1550 are separated as shown because of their location within the laser tracker. In an embodiment, the payload functions 1530 are located in the payload 2170 of FIGS. 9 and 10, while the azimuth encoder electronics 1540 is located in the azimuth assembly 2110 and the zenith encoder electronics 1550 is located in the zenith assembly 2140.

Many types of peripheral devices are possible, but here three such devices are shown: a temperature sensor 1582, a six-DOF probe 1584, and a personal digital assistant, 1586, which might be a smart phone, for example. The laser tracker may communicate with peripheral devices in a variety of means, including wireless communication over the antenna 1572, by means of a vision system such as a camera, and by means of distance and angular readings of the laser tracker to a cooperative target such as the six-DOF probe 1584. Peripheral devices may contain processors. The six-DOF accessories may include six-DOF probing systems, six-DOF scanners, six-DOF projectors, six-DOF sensors, and six-DOF indicators. The processors in these six-DOF devices may be used in conjunction with processing devices in the laser tracker as well as an external computer and cloud processing resources. Generally, when the term laser tracker processor or measurement device processor is used, it is meant to include possible external computer and cloud support.

In an embodiment, a separate communications bus goes from the master processor 1520 to each of the electronics units 1530, 1540, 1550, 1560, 1565, and 1570. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the master processor 1520 sends packets of information over bus 1610 to payload functions electronics 1530, over bus 1611 to azimuth encoder electronics 1540, over bus 1612 to zenith encoder electronics 1550, over bus 1613 to display and UI electronics 1560, over bus 1614 to removable storage hardware 1565, and over bus 1616 to RFID and wireless electronics 1570.

In an embodiment, master processor 1520 also sends a synch (synchronization) pulse over the synch bus 1630 to each of the electronics units at the same time. The synch pulse provides a way of synchronizing values collected by the measurement functions of the laser tracker. For example, the azimuth encoder electronics 1540 and the zenith electronics 1550 latch their encoder values as soon as the synch pulse is received. Similarly, the payload functions electronics 1530 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

The azimuth encoder electronics 1540 and zenith encoder electronics 1550 are typically separated from one another and from the payload electronics 1530 by slip rings, for example. This is why the bus lines 1610, 1611, and 1612 are depicted as separate bus lines in FIG. 11.

The laser tracker electronics processing system 1510 may communicate with an external computer 1590, or it may provide computation, display, and UI functions within the laser tracker. The laser tracker communicates with computer 1590 over communications link 1606, which might be, for example, an Ethernet line or a wireless connection. The laser tracker may also communicate with other elements 1600, represented by the cloud, over communications link 1602, which might include one or more electrical cables, such as Ethernet cables, and one or more wireless connections. An example of an element 1600 is another three dimensional test instrument—for example, an articulated arm CMM, which may be relocated by the laser tracker. A communication link 1604 between the computer 1590 and the elements 1600 may be wired (e.g., Ethernet) or wireless. An operator sitting on a remote computer 1590 may make a connection to the Internet, represented by the cloud 1600, over an Ethernet or wireless line, which in turn connects to the master processor 1520 over an Ethernet or wireless line. In this way, a user may control the action of a remote laser tracker.

Laser trackers today use one visible wavelength (usually red) and one infrared wavelength for the ADM. The red wavelength may be provided by a frequency stabilized helium-neon (HeNe) laser suitable for use in an interferometer and also for use in providing a red pointer beam. Alternatively, the red wavelength may be provided by a diode laser that serves just as a pointer beam. A disadvantage in using two light sources is the extra space and added cost required for the extra light sources, beam splitters, isolators, and other components. Another disadvantage in using two light sources is that it is difficult to perfectly align the two light beams along the entire paths the beams travel. This may result in a variety of problems including inability to simultaneously obtain good performance from different subsystems that operate at different wavelengths. A system that uses a single light source, thereby eliminating these disadvantages, is shown in opto-electronic system 500 of FIG. 12A.

Figure 12A:
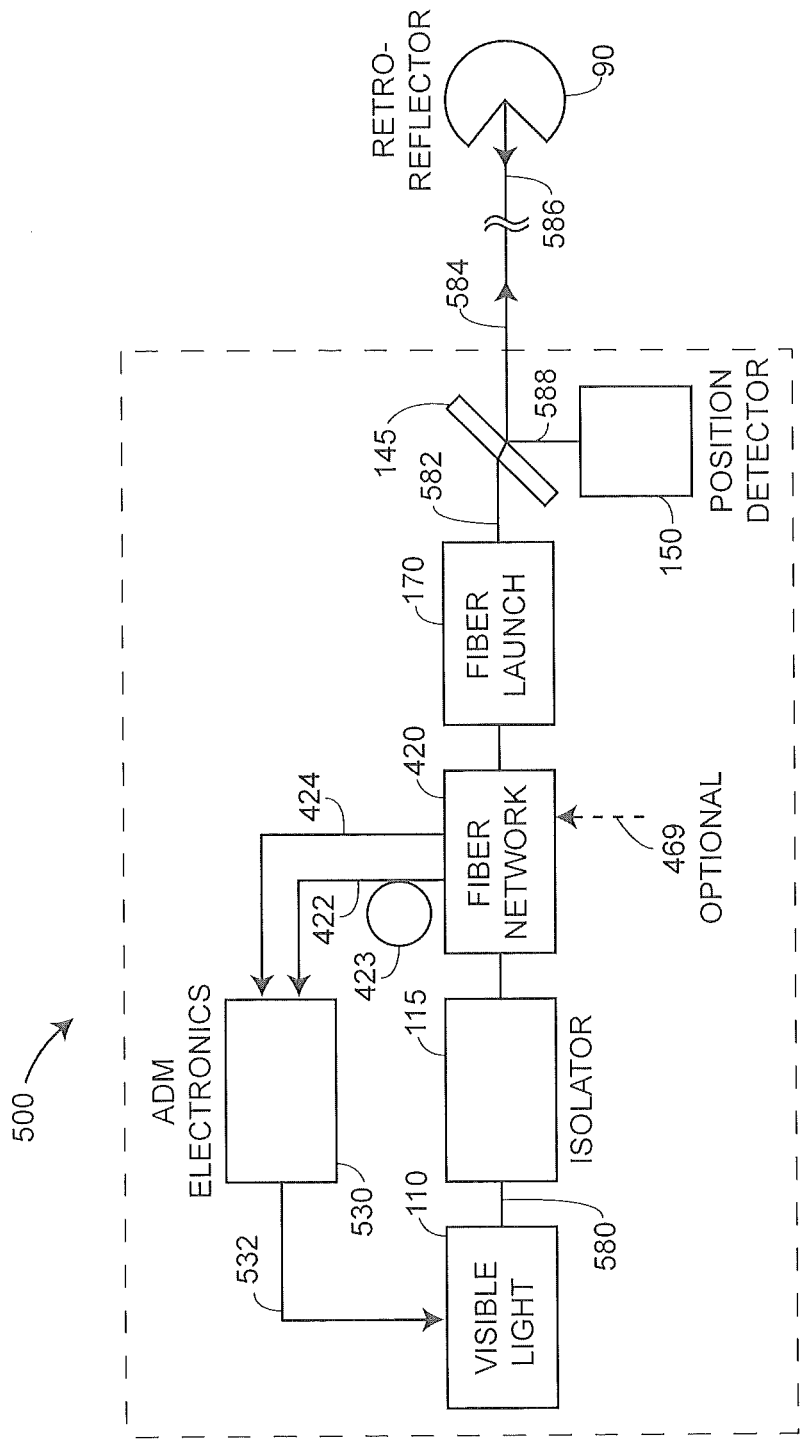
FIG. 12A is a block diagram of elements in a laser tracker that uses a single wavelength according to an embodiment of the present invention.

FIG. 12A includes a visible light source 110, an isolator 115, a fiber network 420, ADM electronics 530, a fiber launch 170, a beam splitter 145, and a position detector 150. The visible light source 110 might be, for example, a red or green diode laser or a vertical cavity surface emitting laser (VCSEL). The isolator might be a Faraday isolator, an attenuator, or any other device capable of sufficiently reducing the amount of light fed back into the light source. The light from the isolator 115 travels into the fiber network 420, which in an embodiment is the fiber network 420A of FIG. 8A.

Figure 12B:
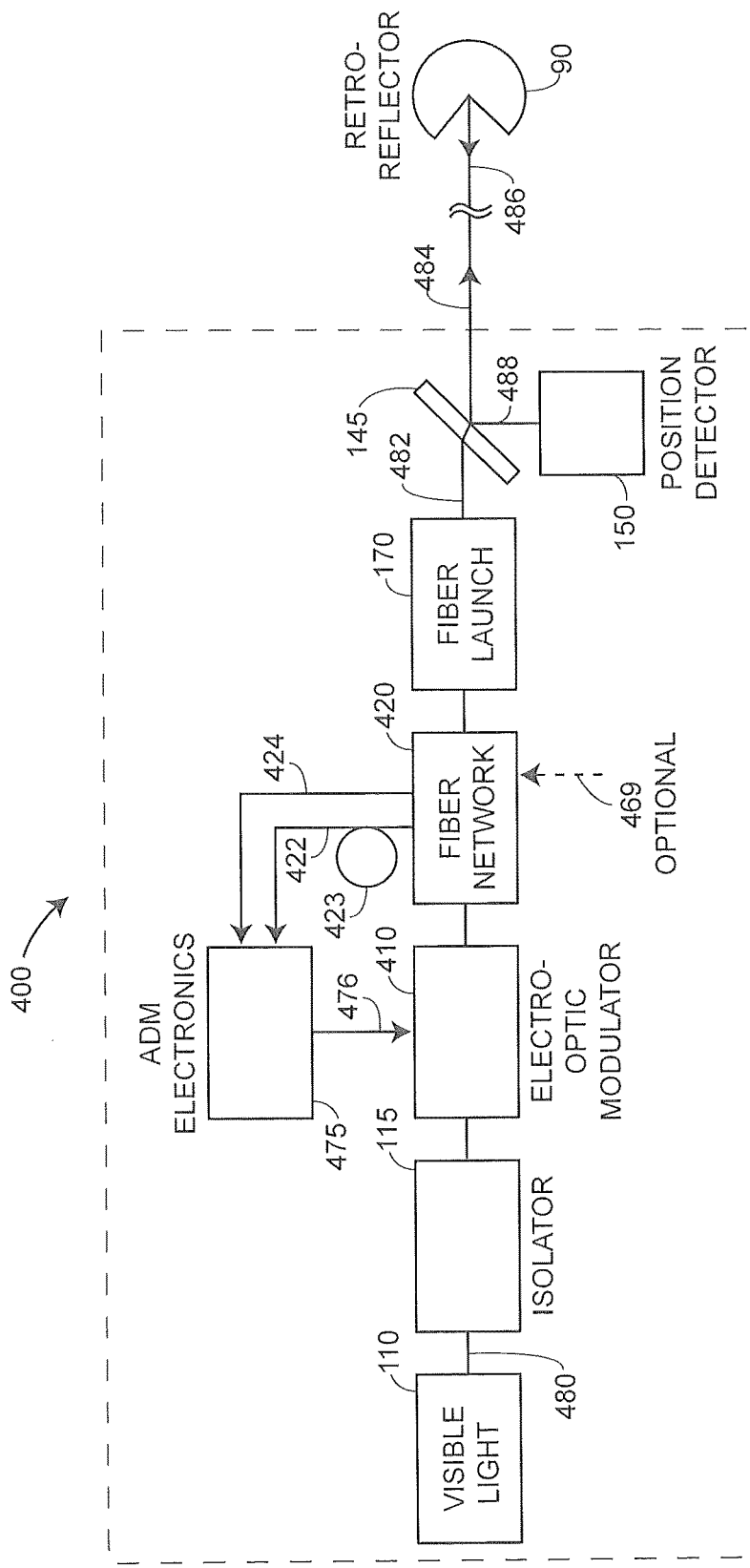
FIG. 12B is a block diagram of elements in a laser tracker that uses a single wavelength according to an embodiment of the present invention.

FIG. 12B shows an embodiment of an optoelectronic system 400 in which a single wavelength of light is used but wherein modulation is achieved by means of electro-optic modulation of the light rather than by direct modulation of a light source. The optoelectronic system 400 includes a visible light source 110, an isolator 115, an electrooptic modulator 410, ADM electronics 475, a fiber network 420, a fiber launch 170, a beam splitter 145, and a position detector 150. The visible light source 110 may be, for example, a red or green laser diode. Laser light is sent through an isolator 115, which may be a Faraday isolator or an attenuator, for example. The isolator 115 may be fiber coupled at its input and output ports. The isolator 115 sends the light to the electrooptic modulator 410, which modulates the light to a selected frequency, which may be up to 10 GHz or higher if desired. An electrical signal 476 from ADM electronics 475 drives the modulation in the electrooptic modulator 410. The modulated light from the electrooptic modulator 410 travels to the fiber network 420, which might be the fiber network 420A, 420B, 420C, or 420D discussed hereinabove. Some of the light travels over optical fiber 422 to the reference channel of the ADM electronics 475. Another portion of the light travels out of the tracker, reflects off retroreflector 90, returns to the tracker, and arrives at the beam splitter 145. A small amount of the light reflects off the beam splitter and travels to position detector 150, which has been discussed hereinabove with reference to FIGS. 6A-F. A portion of the light passes through the beam splitter 145 into the fiber launch 170, through the fiber network 420 into the optical fiber 424, and into the measure channel of the ADM electronics 475. In general, the system 500 of FIG. 12A can be manufactured for less money than system 400 of FIG. 12B; however, the electro-optic modulator 410 may be able to achieve a higher modulation frequency, which can be advantageous in some situations.

Figure 13:
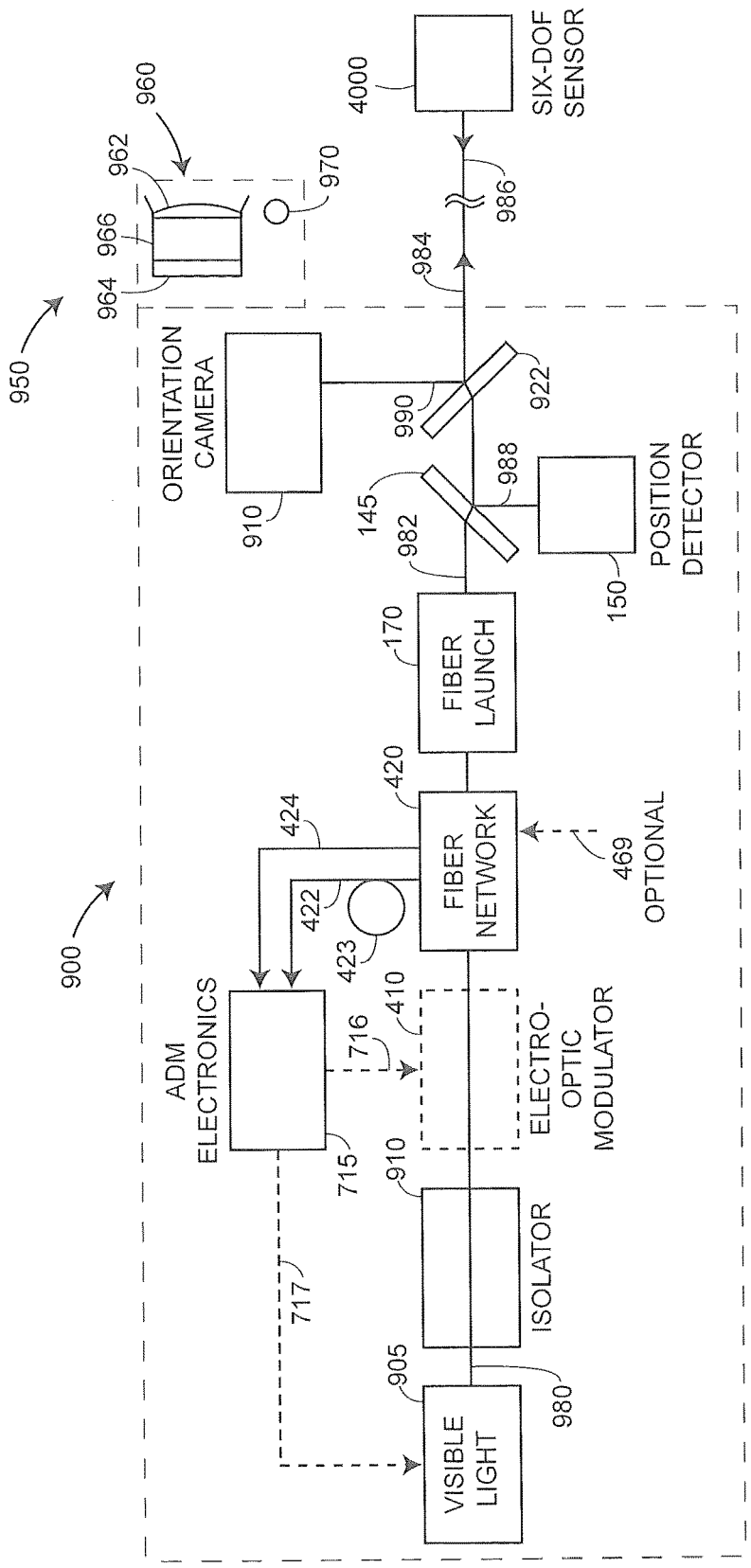
FIG. 13 is a block diagram of elements in a laser tracker with six-DOF capability according to an embodiment of the present invention.

FIG. 13 shows an embodiment of a locator camera system 950 and an optoelectronic system 900 in which an orientation camera 910 is combined with the optoelectronic functionality of a 3D laser tracker to measure six degrees of freedom. The optoelectronic system 900 includes a visible light source 905, an isolator 910, an optional electrooptic modulator 410, ADM electronics 715, a fiber network 420, a fiber launch 170, a beam splitter 145, a position detector 150, a beam splitter 922, and an orientation camera 910. The light from the visible light source is emitted in optical fiber 980 and travels through isolator 910, which may have optical fibers coupled on the input and output ports. The light may travel through the electrooptic modulator 410 modulated by an electrical signal 716 from the ADM electronics 715. Alternatively, the ADM electronics 715 may send an electrical signal over cable 717 to modulate the visible light source 905. Some of the light entering the fiber network travels through the fiber length equalizer 423 and the optical fiber 422 to enter the reference channel of the ADM electronics 715. An electrical signal 469 may optionally be applied to the fiber network 420 to provide a switching signal to a fiber optic switch within the fiber network 420. A part of the light travels from the fiber network to the fiber launch 170, which sends the light on the optical fiber into free space as light beam 982. A small amount of the light reflects off the beamsplitter 145 and is lost. A portion of the light passes through the beam splitter 145, through the beam splitter 922, and travels out of the laser tracker to a six degree-of-freedom (DOF) device 4000. The six-DOF device 4000 may be a probe (e.g., the handheld six-DOF probe 2000 of FIG. 14, described hereinbelow), a scanner, a projector, a sensor, or some other type of six-DOF device.

On its return path to the laser tracker, the light from the six-DOF device 4000 enters the optoelectronic system 900 and arrives at beamsplitter 922. Part of the light is reflected off the beamsplitter 922 and enters the orientation camera 910. The orientation camera 910 records the positions of some marks placed on the retroreflector target. From these marks, the orientation angle (i.e., three degrees of freedom) of the six-DOF probe 4000 is found. The principles of the orientation camera are described hereinafter in the present application and also in the aforementioned patent '758. A portion of the light at beam splitter 145 travels through the beamsplitter and is put onto an optical fiber by the fiber launch 170. The light travels to fiber network 420. Part of this light travels to optical fiber 424, from which it enters the measure channel of the ADM electronics 715.

The locator camera system 950 includes a camera 960 and one or more light sources 970. The locator camera system is also shown with respect to the laser tracker 10 in FIG. 1, where the cameras are elements 52 and the light sources are elements 54. The camera 960 includes a lens system 962, a photosensitive array 964, and a body 966. One use of the locator camera system 950 is to locate retroreflector targets in the work volume. It does this by flashing the light source 970, which the camera picks up as a bright spot on the photosensitive array 964. A second use of the locator camera system 950 is establish a coarse orientation of the six-DOF device 4000 based on the observed location of a reflector spot or LED on the six-DOF device 4000. If two or more locator camera systems 950 are available on the laser tracker 10, the direction to each retroreflector target in the work volume may be calculated using the principles of triangulation. If a single locator camera is located to pick up light reflected along the optical axis of the laser tracker, the direction to each retroreflector target may be found. If a single camera is located off the optical axis of the laser tracker, then approximate directions to the retroreflector targets may be immediately obtained from the image on the photosensitive array. In this case, a more accurate direction to a target may be found by rotating the mechanical axes of the laser to more than one direction and observing the change in the spot position on the photosensitive array.

Figure 14:
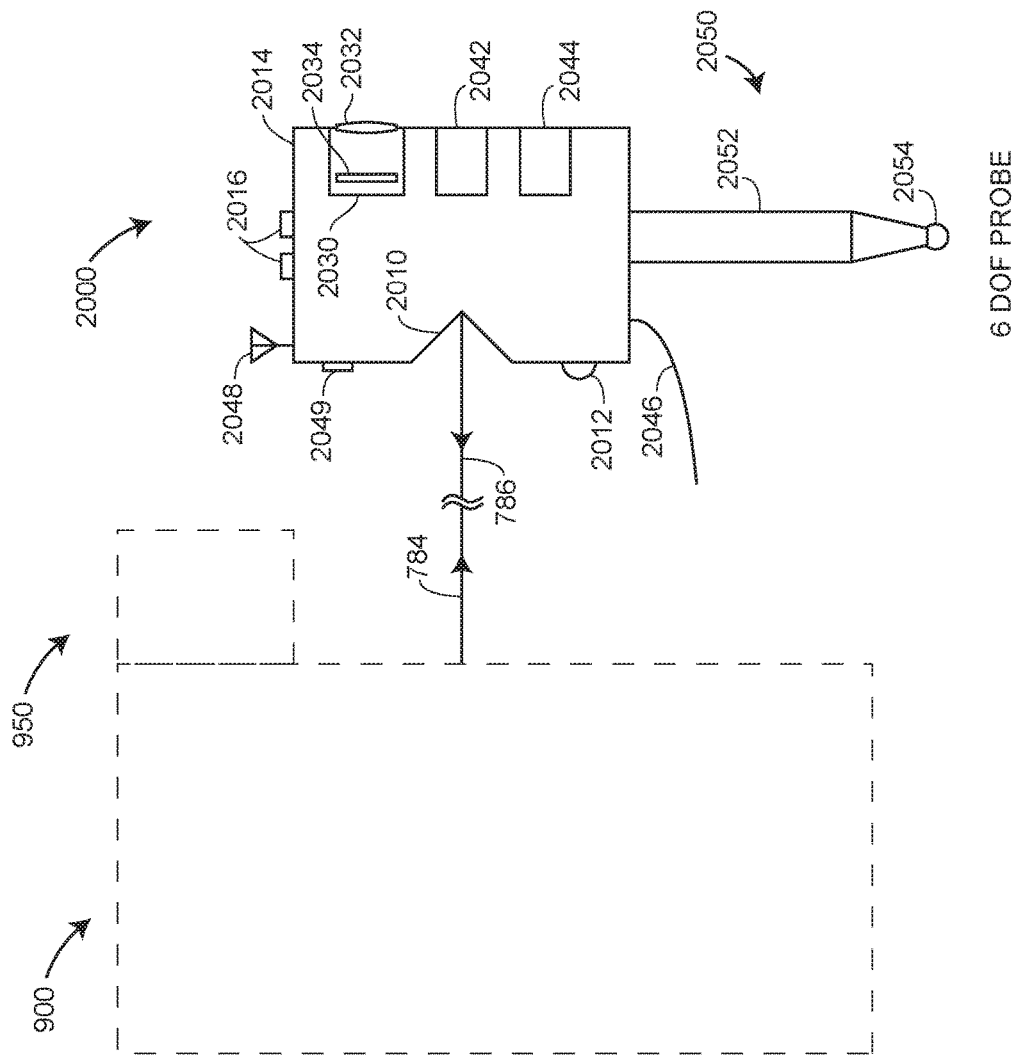
FIG. 14 is a block diagram of elements in a laser tracker having six-DOF capability according to an embodiment of the present invention.

FIG. 14 shows an embodiment of a six-DOF probe 2000 used in conjunction with an optoelectronic system 900 and a locator camera system 950 of a laser tracker. In embodiments of the present invention, the laser tracker may, for example, be any of the laser trackers disclosed and illustrated herein, such as the laser tracker 10 of FIG. 1, or other similar devices not disclosed herein. The optoelectronic system 900 and the locator camera system 950 were discussed in reference to FIG. 13. In another embodiment, the optoelectronic system 900 is replaced by an optoelectronic system having two or more wavelengths of light.

The six-DOF probe (or "wand") 2000, which may be handheld in embodiments of the present invention, includes a body 2014, a retroreflector 2010, a probe extension assembly 2050, an optional electrical cable 2046, an optional battery 2044, an interface component 2012, an identifier element 2049, actuator buttons 2016, an antenna 2048, and an electronics circuit board 2042. The retroreflector 2010 may be a cube corner retroreflector with a hollow core or a glass core. The retroreflector 2010 may be marked in a way that enables determination by the orientation camera within the optoelectronic system 900 of the laser tracker of the three orientational degrees of freedom of the six-DOF probe 2000 that is physically separate from the laser tracker. An example of such markings is a darkening of the lines of intersection between the three planar reflector surfaces of the retroreflector 2010, as discussed in the aforementioned patent '758.

The probe extension assembly 2050 includes a probe extension 2052 and a probe tip 2054. The probe tip 2054 may be a "hard" contact-type probe tip that is typically brought into physical contact with the object under test in order to make 3D coordinate measurements of the surface of the object by determining the 3D coordinates of the probe tip 2054. Although in the embodiment of FIG. 14 the probe tip 2054 is connected with yet separated or located from the body 2014 of the retroreflector 2010 by some distance, it is known that a six-DOF laser tracker can readily determine the 3D coordinates of the probe tip 2054 at a point hidden from the line of sight of the light beam 784 sent from the laser tracker to the six-DOF probe 2000. This is why a six-DOF probe is sometimes referred to as a hidden-point probe.

Electric power may be provided over an optional electrical cable 2046 or by an optional battery 2044. The electric power provides power to an electronics circuit board 2042. The electronics circuit board 2042 provides power to the antenna 2048, which may communicate with the laser tracker or an external computer, and to actuator buttons 2016, which provide the user with a convenient way of communicating with the laser tracker or external computer. The electronics circuit board 2042 may also provide power to an LED, a material temperature sensor (not shown), an air temperature sensor (not shown), an inertial sensor (not shown) or an inclinometer (not shown). The interface component 2012 may be, for example, a light source (such as an LED), a small retroreflector, a region of reflective material, or a reference mark. The interface component 2012 is used to establish the coarse orientation of the retroreflector 2010, which is needed in the calculations of the six-DOF angle to determine the frame of reference of the six-DOF probe 2000. The identifier element 2049 is used to provide the laser tracker with parameters or a serial number for the six-DOF probe 2000. The identifier element may be, for example, a bar code or an RF identification tag.

The laser tracker may alternatively provide the light beam 784 to a retroreflector 2011. By providing the light beam 784 to any of a plurality of retroreflectors, the handheld six-DOF probe or wand 2000 may be physically oriented in a wide variety of directions while probing an object with the probing extension assembly 2050.

The six degrees of freedom of the probe 2000 measured by the laser tracker may be considered to include three translational degrees of freedom and three orientational degrees of freedom. The three translational degrees of freedom may include a radial distance measurement between the laser tracker and a retroreflector, a first angular measurement, and a second angular measurement. The radial distance measurement may be made with an IFM or an ADM within the laser tracker. The first angular measurement may be made with an azimuth angular measurement device, such as an azimuth angular encoder, and the second angular measurement made with a zenith angular measurement device, such as a zenith angular encoder. Alternatively, the first angular measurement device may be the zenith angular measurement device and the second angular measurement device may be the azimuth angular measurement device. The radial distance, first angular measurement, and second angular measurement constitute three coordinates in a spherical coordinate system, which can be transformed into three coordinates in a Cartesian coordinate system or another coordinate system.

The three orientational degrees of freedom of the probe 2000 may be determined using a patterned cube corner, as described hereinabove and in the aforementioned patent '758. Alternatively, other methods of determining the three orientational degrees of freedom of the probe 2000 may be used. The three translational degrees of freedom and the three orientational degrees of freedom fully define the position and orientation of the six-DOF probe 2000 (and, thus, of the probe tip 2054) in space. It is important to note that this is the case for the systems considered here because it is possible to have systems in which the six degrees of freedom are not independent so that six degrees of freedom are not sufficient to fully define the position and orientation of a device in space. The term "translational set" is a shorthand notation for three degrees of translational freedom of a six-DOF accessory (such as the six-DOF probe 2000) in the laser tracker frame of reference. The term "orientational set" is a shorthand notation for three orientational degrees of freedom of a six-DOF accessory (e.g., the probe 2000) in the laser tracker frame of reference. The term "surface set" is a shorthand notation for three-dimensional coordinates of a point on the object surface in the laser tracker frame of reference as measured by the probe tip 2054.

According to embodiments of the present invention, the six-DOF probe 2000 also includes an augmented reality (AR) camera 2030. The AR camera 2030 may be considered to be one that is capable of taking "full field" images. The camera 2030 includes a camera lens 2032 and a photosensitive array 2034. The photosensitive array 2034 may be a CCD or CMOS array, for example. Thus, the camera 2030 may be digital in nature, and may take still images or video images. The camera 2030 may be an integral part of the probe body 2014, or may be attached to the probe body 2014 such that the camera 2030 is in a fixed spatial relationship with respect to the probe body 2014. Either way, since the six degrees of freedom of the probe 2000 are known as described above, the six degrees of freedom (i.e., the "pose") of the AR camera 2030 are also known for each image taken by the AR camera 2030. As such, the laser tracker, probe 2000 and AR camera 2030 may all be placed into a common frame of reference.

Within the lens 2032 (which may be a lens system including a plurality of lens elements), there is a perspective center of the lens. The rays of light passing through the lens 2032 may be considered to pass through the perspective center before arriving at the photosensitive array 2034. In a careful analysis, the lens 2032 may be characterized to account for lens aberrations, which result in a slight shift in the intersection positions of the rays on the photosensitive array 2034. However, without losing generality, it is possible to say that the rays pass through the perspective center, with aberration correction to the image provided in another step of image processing.

The surface of an object under investigation is imaged by the lens 2032 onto the photosensitive array 2034 to form an image on the collection of pixels that are a part of the photosensitive array 2034. Light falling on each pixel is converted, within an integration period of the camera, from a charge into a digital signal. An analog-to-digital converter, either located within the photosensitive array 2034 (for CMOS arrays) or external to the array 2034 (for CCD arrays), performs the conversion from analog to digital signal. The signal for each pixel is typically given in a binary representation of between 8 and 12 bits. The 1's and 0's represented by these bits are delivered over parallel channels, and may be converted into serial form using a serializer/deserializer capability for transmission over a bus line.

As discussed, the six-DOF probe 2000 is handheld in embodiments of the present invention. However, in other embodiments the probe 2000 may be kept stationary by placing it on a stationary mount, stand, or fixture; for example a tripod. Further, although the position and orientation of the six-DOF probe 2000 are known from the six-DOF measurements made by the laser tracker as described hereinabove and although corrections can be made for movements of a handheld six-DOF probe 2000, the resulting noise may be somewhat greater than it would have been if the probe 2000 were kept stationary. It is also possible to mount the six-DOF probe on a robot or machine tool.

In embodiments of the present invention, multiple two-dimensional (2D) camera images taken by an augmented reality camera 2030 that is part of a six-DOF probe 2000 (which itself is used in conjunction with a laser tracker) are combined or "registered" together according to a method, described hereinbelow, to obtain a three-dimensional (3D) image representation of various real-world features such as, for example, a surface of an object or of some real-world scene (e.g., the inside of a building, the location of a vehicle accident, or a crime scene). This method is based on the fact that because the pose or six degrees of freedom of the probe 2000 having the integral AR camera 2030 is known for each 2D photograph or image taken by the AR camera 2030, a plurality of the 2D photographic images taken by the AR camera 2030 may be combined together to form a 3D image.

A method according to this embodiment is now described with reference to the method 1500 of FIG. 15. In a step 1505, a six-DOF probe assembly and a coordinate measurement device are provided. The six-DOF probe assembly includes a probe stylus and a probe head. The probe stylus includes a probe tip that has a spherical shape over a portion of its surface, with the spherical shape having a probe center. The probe head includes a retroreflector and an integral camera. The integral camera may also be referred to as an augmented reality (AR) camera. The coordinate measurement device, which might be a laser tracker, has a device frame of reference and is separate from the six-DOF probe assembly. The coordinate measurement device includes an orientation sensor, a first and second motor, a first and second angle measuring device, a distance meter, a position detector, a control system, and a processor. The laser tracker and six-DOF probe with AR camera may be identical or similar to those described and illustrated hereinabove; for example, in FIG. 14 or otherwise.

A step 1510 is, in a first instance, measuring with the device the two angles of rotation and distance to the retroreflector and the three orientational degrees of freedom of the six-DOF probe assembly. In this step, a 2D image is also formed on the AR camera. The electronics circuit board 2042 within the six-DOF probe 2000 may process and/or send the position and orientation information from the AR camera 2030. The electronics circuit board 2042 may also receive a first digital signal representing a 2D image sent through the camera lens 2032 onto the photosensitive array 2034.

In a step 1515, the six-DOF probe is moved to a new position, the device measures the two angles and distance to the six-DOF probe assembly and the orientation of the six-DOF probe assembly. It also forms a 2D image at the new position. The electronics circuit board 2042 may process and/or send the position and orientation information from the AR camera 2030 at this second position and orientation to the laser tracker. The electronics circuit board 2042 may also receive a second digital signal representing the 2D image sent through the camera lens 2032 onto the photosensitive array 2034.

In a step 1520, a cardinal point in common to the first image and a second image is found. The term "cardinal point" is typically used to refer to points that are identified in images and that can be used to connect or register the images together. Also, these points are typically not placed intentionally at their locations by someone.

A step 1525 is determining the corresponding locations of a cardinal point on a photosensitive array in first and second instances. We may refer to the location of the cardinal point in the first instance as the first location and the location of the cardinal point in the second instance as the second location. There is a well-developed collection of techniques that may be used to determine such cardinal points, generally using methods referred to as image processing or feature detection. A commonly used but general category for finding cardinal points is referred to as interest point detection, with the points detected referred to as interest points. According to the usual definition, an interest point has a mathematically well-founded definition, a well-defined position in space, an image structure around the interest point that is rich in local information content, and a variation in illumination level that is relatively stable over time. A particular example of an interest point is a corner point, which might be a point corresponding to an intersection of three planes, for example. Another example of signal processing that may be used is scale invariant feature transform (SIFT), which is a method well known in the art and described in U.S. Pat. No. 6,711,293 to Lowe. In the step 1520, the processor finds those cardinal points common to the first and second images to obtain at least one cardinal point (but usually a large set of cardinal points). Other common feature detection methods for finding cardinal points include edge detection, blob detection, and ridge detection.

A step 1530, is determining the 3D coordinates of the cardinal point in 3D space within a first frame of reference. These points in 3D space may be obtained through a mathematical method of triangulation. In the first instance, the position and orientation of the camera 2030 is found in a first frame of reference (which might, for example, be the device frame of reference) based on the two angle measurements, one distance measurement, and orientation angle measurements provided by the device. In the second instance, the position and orientation of the camera is again obtained. With the camera positions and orientations known in the two instances, a baseline having a known distance may be drawn between the perspective centers of the camera in the first and second instances. Furthermore, because the orientation of the camera is known, along with the focal length of the lens 2032, the distance from the lens to the photosensitive array 2034, and the spacing between the pixels on the array, the angles of projection of optical rays from 3D space onto the photosensitive array is known. Once a cardinal point is associated on each of the first and second photosensitive arrays (by identifying a first location on the photosensitive array in the first instance and a second location on the photosensitive array in a second instance), a projection may be made from the cardinal point on the array in each instance out into 3D space in the first frame of reference. In the ideal case, these rays will intersect in 3D space, but in general they will nearly intersect, and a point of closest approach between the rays may be used to determine the position of intersection. This position of intersection represents the 3D coordinates of the cardinal point in 3D space. Because the baseline distance is known based on six-DOF measurements by the tracker, the cardinal point is accurately scaled in 3D space. In other words, if this method is used to obtain 3D coordinates of two cardinal points in 3D space, the distance between the two cardinal points is properly indicated (scaled). This is in contrast to a method of obtaining two images with a camera held in two different positions for which the positions and orientations of the camera perspective center in each case is unknown. This method does not provide enough information to properly scale a 3D image (in units of length).

A step 1530 is creating a composite 3D image from the first and second images also using the 3D coordinates of the cardinal point in the first frame of reference. In most cases, the first and second 2D images will share many cardinal points, and for each of these 3D coordinates can be obtained. These cardinal points form the framework for a 3D representation onto which other image elements may be interpolated between the two 2D images or among multiple 2D images (in a more general case). Besides providing 3D coordinate information, a composite 3D image may also convey texture and color information obtained not only from cardinal points but also from visible regions between the cardinal points, again using interpolation methods.

A step 1535 is storing the composite 3D image.

Although not included in the procedure 1500 of FIG. 15, it is clear that the method described hereinabove may be extended to an arbitrarily large number of photosensitive array images so that sets of cardinal points may be obtained from multiple images. In this case, each cardinal point may correspond to cardinal points on several of the images obtained with the photosensitive array 2034 in different poses of the AR camera 2030. For a given cardinal point, the points of intersection of the multiple lines projected from the photosensitive array 2034 through the perspective centers of the camera lens 2032 may be determined using a best-fit method according to methods of optimization well known in the art, for example, by using least-squares minimization methods. Additional optimization of registration of the multiple images may be carried out, if desired, by providing targets on or near the object under test. Additional targets may be reflective targets or light emitting diodes, for example.

If the AR camera 2030 is a color camera, the reconstructed 3D surface may be represented in color, or other texture attributes may be retrieved. Various features of light pattern, in addition to 3D surface profile, may be provided by this method 1500 in other embodiments. For example, an "X" marked on the surface of an object may be retrieved in addition to the general coordinates corresponding to the location of the "X."

In some cases, it may be known ahead of time that certain portions of surfaces being photographed are relatively smooth. In other words, these portions do not have any sharp discontinuities or fine features. In these cases, it may be possible to use the established cardinal points to construct an unmeasured portion of the surface in three dimensions. For example, the cardinal points may fit smoothly onto a cylindrical shape over a portion of the surface, and so software may automatically provide the cylindrical shape.

In the case that an overall shape for a portion of a surface is known, it may be possible to project a captured image onto the surface. For example, suppose that the surface has a colored pattern that may be projected onto an assumed surface, which in a particular case might be a flat surface, for example. In this case, this pattern may be projected onto the assumed surface from each of images obtained for the camera 2030 in different poses (a "pose" being a combination of a three degree-of-freedom position and a three degree-of-freedom orientation). In this instance, the images would be expected to overlap on the surface. If this is not the case, it would indicate that the assumed shape is not correct, and a change to the shape should be made. In this instance, it may be a good practice to obtain additional cardinal points based on the images captured by the camera in the different poses. These additional cardinal points may then be used to more accurately determine the surface profile.

An AR camera may be used to capture background images, for example of relatively distant background objects over a relatively large field of view and it may also be used to capture foreground images, which may be, for example, images of an object being probed by the six-DOF probe 2000. Processing of the AR camera data to obtain 3D surface coordinates may be supplemented with measurements made by the six-DOF probe tip 2054. Such tactile measurements may be useful to obtain data in holes or other regions not visible to the camera. In addition, it is generally expected that six-DOF probe data collected with a probe tip 2054 will be much more accurate than that obtained by reconstruction of camera images.

In some cases, the probe tip 2054 may be used to obtain 3D measurements of regions for which few if any cardinal points are obtained through the image processing analysis. As an example of how such additional markers may be identified as cardinal points through use of a probe tip 2054, a fiducial marker or target may be placed at each of a number of known positions and orientations in space. For example, a nest may serve as a fiducial, and a probe tip 2054 brought into contact with the nest to determine a 3D coordinate and this same point may also be recognized as a cardinal point in the images obtained with the AR camera. A "fiducial" target may be taken to mean that someone intentionally placed the target at a known particular position and orientation in space. As such, the position and orientation in space of the fiducial target may be known with respect to the laser tracker and the six-DOF probe 2000.

Figure 15:
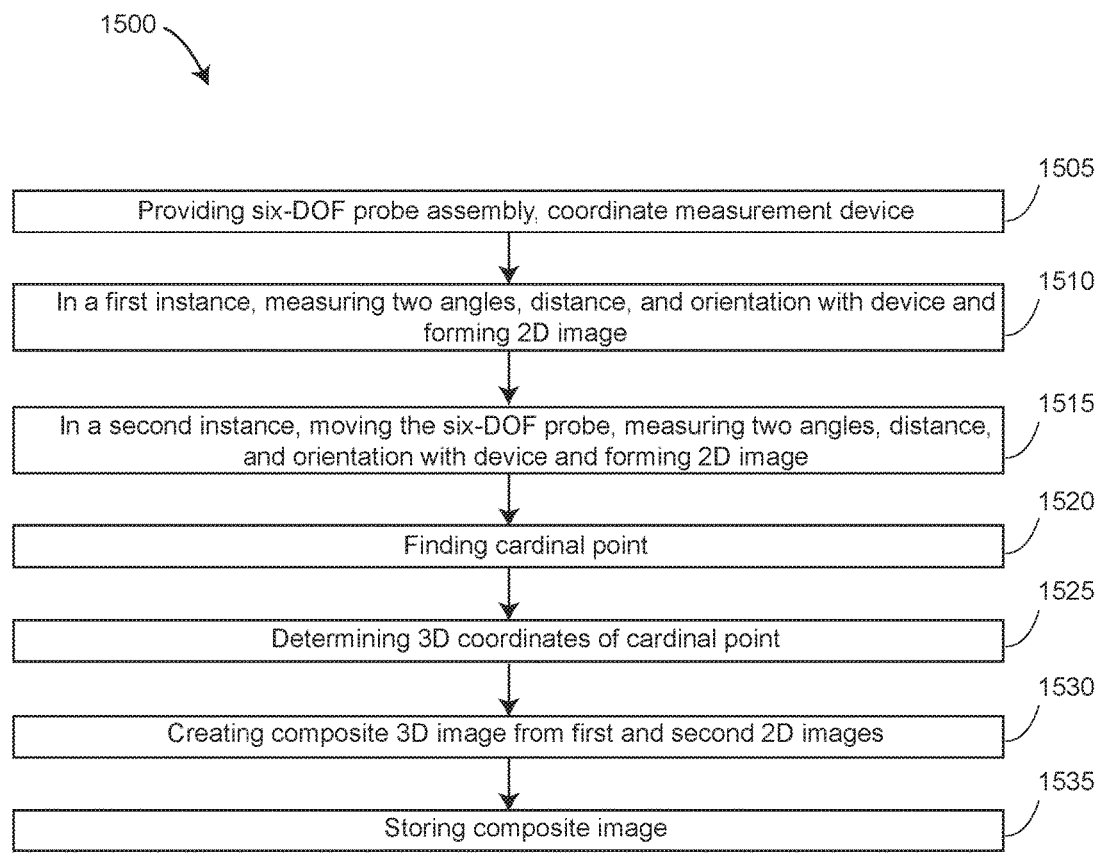
FIG. 15 is a flow chart that includes steps in a method of obtaining a three-dimensional representation of a surface using an augmented reality camera attached to a six-DOF probe according to an embodiment of the present invention.

As can be seen from the foregoing "dynamic triangulation" method 100 as illustrated in FIG. 15, the images taken by the AR camera 2030 at various camera positions and orientations are registered together based in part on knowledge of the six degrees of freedom provided by the laser tracker. As such, it is possible to register the 2D images from the AR camera 2030 with proper dimensional scale and with fewer camera images that would otherwise be possible.

Once the 3D images have been created by embodiments of the method of the present invention, these images may have data overlaid or superimposed thereon. For example, if the 3D images are those of an object being built or already built, the data superimposed on the 3D images may comprise CAD design data of the object. The CAD data may be stored in memory associated with the laser tracker 10 (FIG. 1). Other types of data may be superimposed on the camera images such as, for example, marks to indicate where various assembly operations (drilling, attaching, etc.) are to be performed.

An AR camera 2032 in 6DOF probe 2000 may be used to measure surroundings instead of (or in addition to) a part being measured with the probe tip 2054. For example, the camera 2030 may have a relatively long focal length that enables it to clearly image its surroundings. Reconstruction methods described hereinabove may be used to obtain a 3D representation of the surroundings based on the AR camera images. For example, one or more parts measured to an accuracy of a few micrometers or tens of micrometers with the probe tip 2054 may be placed within surroundings measured to an accuracy of a few millimeters based on the AR camera images.

Software may be used to observe the object and the surroundings from different perspectives and different distances, with the parallax shift between the object and surroundings properly represented. In some cases, the background information may be important. For example, a project may involve attaching a structure to the object being measured while confirming that there is adequate room in the 3D surroundings having a 3D image obtained with the AR camera. Such a structure may be available as a CAD model, as a scanned image of a part or assembly, or as a scaled 3D representation obtained through the use of multiple camera images.

In some cases, the AR camera may be used to obtain representations of areas ordinarily obstructed from view. For example, the AR camera may be used to view all sides of an object to obtain 3D images of regions not easily measured with the probe tip 2054. Such full coverage from all directions is particularly useful when images are displayed—for example, in a presentation, on a website, or in a brochure. The addition of color (texture) from the AR camera is also of value in this instance. 3D representations obtained from the probe and AR camera may be supplemented by other 3D representations. Models of parts, assemblies, furniture, and so forth, may in some cases be downloaded from files or websites and incorporated into a composite 3D representation.

Another important use for the AR camera 2030 and 6DOF probe tip 2054 is to obtain proper scaling of surroundings. For example, a wall may have a left side, a right side, an upper side, and a lower side. Although the method of matching cardinal points described hereinabove provides scaled 3D images, the dimensional accuracy will generally be much better is 3D coordinates are measured with six-DOF probe than with camera images alone. By combining the composite 3D image obtained from the 2D AR camera images with a few measurements with the six-DOF probe tip 2054, the scaling accuracy of the composite 3D image can, in many cases, be greatly improved. For example, improved scale of a building may be obtained by measuring one or more positions on each of the left, right, upper, and lower sides with the probe tip 2054.

The AR camera may be used to measure only surroundings, only objects, or both surroundings or objects. As the term is used here, the word "object" means an item for which accurate dimensional information is desired. An object is typically measured by the six-DOF probe which has accuracy on the order of a few tens of micrometers. Measurement by an AR camera provides the ability to superimpose images on drawings (for example, CAD). In addition, by obtaining 2D images of an object from multiple directions, it is possible to provide an overlay to an object from all directions.

An object may be placed within its surroundings, the 3D coordinates of which are obtained through the use of the AR camera. With the information provided by the AR camera and six-DOF probe, it is possible to view the objects from a variety of perspectives relative to its surroundings and also to view an object or its surroundings from all directions.

In an embodiment, a purely graphical element (which could be a photographic element, a drawn element, or a rendered element, for example) is placed within a composite image. A first example of such a graphical element is an addition to a machine tool on a factory floor. Such an addition may be superimposed on a CAD model to which a composite color image is overlaid. The addition might be a new machined part. A collection of such additions may be placed in the context of a factory environment to ensure that all elements fit properly. A second example of such a graphical element is a new item of machinery or furniture placed in the same factory environment. A question might be whether such an element will fit in the new plans. In some cases, websites may be available that enable downloading of such 3D images from the Cloud, which is a network typically found on the Internet through a service provider. With some user interfaces, such a 3D component may be moved into position with a computer mouse and then viewed from different positions and orientations.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system comprising:
   a six-degree of freedom (six-DOF) probe assembly, the six-DOF probe assembly including a probe head having a retroreflector and an integral camera;
   a coordinate measurement device having a device frame of reference, the coordinate measurement device including a distance meter, an orientation sensor, and a control system electrically coupled to a processor, the coordinate measurement device being operable to direct a first beam of light to a first direction, the first direction determined at least by a first angle of rotation about a first axis and a second angle of rotation about a second axis;
   wherein the processor is operable to execute non-transient computer readable instructions, the computer readable instructions comprising:
   in a first instance:
      measuring a first distance to the retroreflector with the distance meter and a first set of three orientational degrees of freedom with the orientation sensor;
      forming a first 2D image of the object with the camera;
   in a second instance:
      in response to the six-DOF probe assembly being moved, measuring a second distance to the retroreflector with the distance meter and a second set of three orientational degrees of freedom with the orientation sensor;
      forming a second 2D image of the object with the camera;
   determining a first cardinal point in common between the first 2D image and the second 2D image, the first cardinal point being positioned a first location on the first 2D image and a second location on the second 2D image;
   determining 3D coordinates of the first cardinal point in a first frame of reference;
   creating a first composite 3D image from the first 2D image and the second 2D image based at least in part on the first 2D image, the second 2D image, and the 3D coordinates of the first cardinal point in the first frame of reference; and
   storing the first composite 3D image.

2. The system of claim 1, wherein the six-DOF probe assembly further includes a probe stylus having a spherical tip portion.

3. The system of claim 2, wherein the computer readable instructions further comprising, in the first instance, identifying a first point on a surface in response the tip portion touching the surface, the first point being visible in the first 2D image and the second 2D image.

4. The system of claim 3, wherein the computer readable instructions further comprising, in the first instance, measuring with the coordinate measurement device a first 3D coordinates of the first point.

5. The system of claim 4, wherein the computer readable instructions further comprising, in the second instance, identifying a second point on the surface in response to touching the tip portion to the surface, the second point being visible in the first 2D image and the second 2D image.

6. The system of claim 5, wherein the computer readable instructions further comprising, in the second instance, measuring with the coordinate measurement device a second 3D coordinates of the second point.

7. The system of claim 6, wherein the computer readable instructions further comprises changing a scale of the first composite 3D image based at least in part on the first 2D image, the second 2D image, the first 3D coordinates and the second 3D coordinates.

8. The system of claim 2, wherein the computer readable instructions further comprise:
   measuring a first plurality of points on an object with the coordinate measurement device in response to the contacting of the tip portion to the object; and
   forming a first graphical representation from a first observer perspective that includes the first composite 3D image and the first plurality of points.

9. The system of claim 8, further comprising forming a second graphical representation from a second observer perspective that includes the first composite 3D image and the first plurality of point, the second observer perspective being different that the first observer perspective.

10. A method comprising:
    providing a six-degree of freedom (six-DOF) probe assembly, the six-DOF probe assembly including a probe head having a retroreflector and an integral camera;
    providing a coordinate measurement device having a device frame of reference, the coordinate measurement device including a distance meter, an orientation sensor, and a control system electrically coupled to a processor, the coordinate measurement device being operable to direct a first beam of light to a first direction, the first direction determined at least by a first angle of rotation about a first axis and a second angle of rotation about a second axis;
    in a first instance:
       measuring a first distance to the retroreflector with the distance meter and a first set of three orientational degrees of freedom with the orientation sensor;
       forming a first 2D image of the object with the camera;
    in a second instance:
       moving the six-DOF probe assembly;
       measuring a second distance to the retroreflector with the distance meter and a second set of three orientational degrees of freedom with the orientation sensor;
       forming a second 2D image of the object with the camera;
    determining a first cardinal point in common between the first 2D image and the second 2D image, the first cardinal point being positioned a first location on the first 2D image and a second location on the second 2D image;
    determining 3D coordinates of the first cardinal point in a first frame of reference;
    creating a first composite 3D image from the first 2D image and the second 2D image based at least in part on the first 2D image, the second 2D image, and the 3D coordinates of the first cardinal point in the first frame of reference; and storing the first composite 3D image.

11. The method of claim 10, wherein the six-DOF probe assembly further includes a probe stylus having a spherical tip portion.

12. The method of claim 11, wherein:
in the first instance further includes touching the tip portion to a first point on a surface; and
the first point being visible in the first 2D image and the second 2D image.

13. The method of claim 12, further comprising in the first instance measuring with the coordinate measurement device a first 3D coordinates of the first point.

14. The method of claim 13, wherein:
in the first instance further includes touching the tip portion to a second point on the surface; and
the second point being visible in the first 2D image and the second 2D image.

15. The method of claim 14, further comprising in the second instance measuring with the coordinate measurement device a second 3D coordinates of the second point.

16. The method of claim 15, further comprising changing a scale of the first composite 3D image based at least in part on the first 2D image, the second 2D image, the first 3D coordinates and the second 3D coordinates.

17. The method of claim 11, further comprising:
measuring a first plurality of points on an object with the coordinate measurement device by contacting the tip portion to the object; and
forming a first graphical representation from a first observer perspective that includes the first composite 3D image and the first plurality of points.

18. The method of claim 17, further comprising forming a second graphical representation from a second observer perspective that includes the first composite 3D image and the first plurality of point, the second observer perspective being different that the first observer perspective.

19. The method of claim 17, further comprising:
providing a drawing; and
superimposing the first composite 3D image onto the drawing.

20. The method of claim 17 further comprising:
providing a first graphical element, the first graphical element being a mechanical extension of the object; and
superimposing the first graphical element on the first composite 3D image.

* * * * *